United States Patent
Dixon et al.

(10) Patent No.: US 12,201,944 B2
(45) Date of Patent: Jan. 21, 2025

(54) APPARATUS AND METHODS FOR CLEANING REVERSE OSMOSIS SYSTEMS

(71) Applicant: SYNAUTA INC., Canmore (CA)

(72) Inventors: Michael Bruce Dixon, Canmore (CA); Cole David Maclean, Calgary (CA); Nicholas Herold, Calgary (CA); Justin Quaintance, Calgary (CA)

(73) Assignee: SYNAUTA INC., Canmore (CA)

( * ) Notice: Subject to any disclaimer, the term of this patent is extended or adjusted under 35 U.S.C. 154(b) by 544 days.

(21) Appl. No.: 17/599,924

(22) PCT Filed: Jun. 2, 2021

(86) PCT No.: PCT/CA2021/050754
§ 371 (c)(1),
(2) Date: Sep. 29, 2021

(87) PCT Pub. No.: WO2021/243458
PCT Pub. Date: Dec. 9, 2021

(65) Prior Publication Data
US 2023/0072711 A1    Mar. 9, 2023

Related U.S. Application Data

(60) Provisional application No. 63/033,460, filed on Jun. 2, 2020.

(51) Int. Cl.
*B01D 61/10* (2006.01)
*B01D 61/02* (2006.01)
(Continued)

(52) U.S. Cl.
CPC .......... *B01D 61/10* (2013.01); *B01D 61/025* (2013.01); *B01D 61/12* (2013.01); *C02F 1/008* (2013.01);
(Continued)

(58) Field of Classification Search
CPC ...... B01D 61/12; B01D 61/10; B01D 61/025; B01D 2311/16; B01D 2313/701;
(Continued)

(56) References Cited

U.S. PATENT DOCUMENTS 8,918,217 B2   12/2014   Subbiah et al.
9,248,406 B2   2/2016    Subbiah et al.
(Continued)

FOREIGN PATENT DOCUMENTS

CN    105921017         9/2016
JP    2018513383 A  *   5/2018
(Continued)

OTHER PUBLICATIONS

JP 2018513383A, English Machine translation, pp. 1-29 (Year: 2018).*

(Continued)

*Primary Examiner* — Claire A Norris
(74) *Attorney, Agent, or Firm* — Kristian Ziegler, Esq.; Heslin Rothenberg Farley & Mesiti P.C.

(57) ABSTRACT

Apparatus and processes for controlling a reverse osmosis system for water desalination to reduce energy consumption. The system has a controller configured to receive information from the sensor array and determine a fouling parameter for each reverse-osmosis stage based on one or more of: an A-Value, a B-value and a normalized differential pressure. The controller is then configured to control the flow through each of the reverse-osmosis assemblies based on the determined fouling parameters to meet a predetermined criterion for total permeate production for the reverse-osmosis system.

21 Claims, 7 Drawing Sheets

(51) Int. Cl.
   *B01D 61/12*  (2006.01)
   *C02F 1/00*   (2023.01)
   *C02F 1/44*   (2023.01)
(52) U.S. Cl.
   CPC .......... *C02F 1/441* (2013.01); *B01D 2311/16* (2013.01); *B01D 2313/701* (2022.08); *C02F 2209/006* (2013.01); *C02F 2209/02* (2013.01); *C02F 2209/03* (2013.01); *C02F 2209/05* (2013.01); *C02F 2209/40* (2013.01)
(58) Field of Classification Search
   CPC .... C02F 1/441; C02F 1/008; C02F 2209/006; C02F 2209/03; C02F 2209/02; C02F 2209/05; C02F 2209/40
   USPC .......................................... 700/266; 210/652
   See application file for complete search history.

(56) References Cited

U.S. PATENT DOCUMENTS

| | | | |
|---|---|---|---|
| 9,314,742 | B2 | 4/2016 | Goodfellow |
| 9,360,848 | B2 | 6/2016 | Bonnelye et al. |
| 9,709,429 | B2 | 7/2017 | Chatterjee |
| 9,737,858 | B2 | 8/2017 | Subbiah et al. |
| 10,139,331 | B2 | 11/2018 | Hong et al. |
| 10,472,254 | B2 | 11/2019 | Kim et al. |
| 10,562,787 | B2 * | 2/2020 | Hoek .................... B01D 65/02 |
| 2011/0240557 | A1 | 10/2011 | Goodfellow |
| 2017/0209834 | A1 | 7/2017 | Cohen et al. |
| 2018/0161730 | A1 | 6/2018 | Coster et al. |
| 2019/0184343 | A1 | 6/2019 | Hagawa et al. |
| 2020/0254391 | A1 | 8/2020 | Lee et al. |

FOREIGN PATENT DOCUMENTS

| | | | | |
|---|---|---|---|---|
| KR | 101995355 | B1 | 7/2019 | |
| WO | 2009104035 | A1 | 8/2009 | |
| WO | 2010109265 | A1 | 9/2010 | |
| WO | 2013021468 | A1 | 2/2013 | |
| WO | WO-2013163146 | A1 * | 10/2013 | ........... B01D 61/025 |
| WO | 2014112568 | A1 | 7/2014 | |
| WO | 2016025590 | A1 | 2/2016 | |
| WO | 2019234439 | A1 | 12/2019 | |
| WO | 2019234440 | A1 | 12/2019 | |
| WO | 2019243552 | A1 | 12/2019 | |
| WO | 2020160655 | A1 | 8/2020 | |

OTHER PUBLICATIONS

Dow Water and Process Solutions, "Filmtec Reverse Osmosis Membranes", Technical Manual ( 2010), pp. 1-181, Form 609-00071-1009.

Satyam Srivastava et al., "Design and development of reverse osmosis (RO) plant status monitoring system for early fault prediction and predictive maintenance", Applied Water Science (2018), pp. 1-10, 8:159.

International Search Report and Written Opinion issued in PCT/CA2021/050754 mailed on Aug. 25, 2021.

* cited by examiner

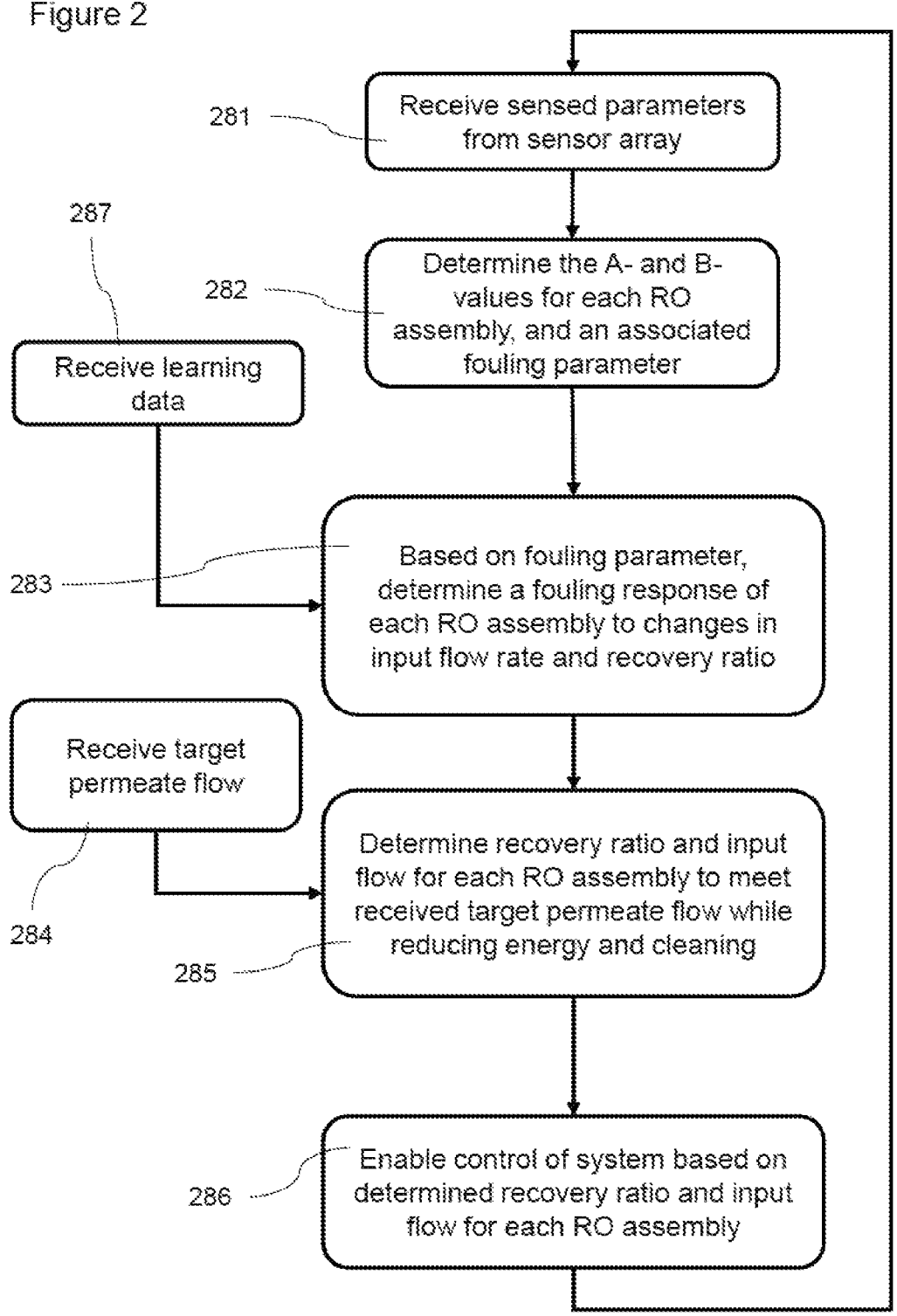

APPARATUS AND METHODS FOR CLEANING REVERSE OSMOSIS SYSTEMS

FIELD OF THE INVENTION

The invention disclosed herein relates to processes for water desalination. In particular, the invention relates to measuring parameters in a reverse osmosis system and controlling the system to monitor, predict and reduce the operating costs associated with cleaning.

BACKGROUND OF THE INVENTION

Generally optimizing a plant consists of calculating various parameters and setting up the plant to operate best over a range of projected conditions. However, a precise cleaning routine has been overlooked for many years due to the difficulty in calculation.

In terms of cleaning, simple rules are usually applied that have no derivation from plant costs. Cleaning is usually scheduled as a preventative maintenance item (for example on the fourth Wednesday of the month) or undertaken when differential pressure increases by 15%. Alternately, cleaning may be performed when normalized salt passage increases 10% or normalized flux decreases by 10%. (Page 2 of Nitto™ Hydranautics™ Technical Service Bulletin, December 2014, TSB107.24, URL: https://membranes.com/docs/tsb/TSB107.pdf).

A designer can take weeks or months to dial in the perfect conditions on paper for a plant. Once constructed, the operator generally has very little time to optimize the operating conditions to match the tight conditions set by the designer.

Many plant alarms can occur daily, and it is the operator's job to fix the issues as quickly as possible. The overriding objective in operating plants is usually to avoid the non-provision of water to the city. This is normally a higher priority than energy usage and is often heavily penalized through fines. Therefore, plants are typically operated in such a way as to avoid downtime, rather than to reduce energy consumption.

In order to manually optimize a plant, operators typically need to be skilled in mathematics and trained in using the equations to normalize data, make an informed decision based on experience and make changes to the plant. In the process there are several informed guesses made, such as the properties of the reverse osmosis membranes. These can be measured, but results take typically weeks to arrive and are not always accurate.

Crucially, such optimisation may require a plant shutdown and sacrifice of several Reverse Osmosis elements (for laboratory testing) to obtain the necessary accuracy. The other unknown variables include the energy efficiency of the pump and associated motor. These variables constantly change with flow as well as with age of the pump. Thus, the mathematics is difficult to process and is in many cases beyond the skill set of the operator. Leading global experts in Reverse Osmosis may realistically take a week or longer for a single optimization point to be attained.

A number of new technologies have been explored to predict cleaning and/or to reduce energy (e.g. pumps, membranes, pressure exchange systems). In the context of a reverse osmosis system, 2-3% energy savings may be considered significant.

U.S. Pat. No. 8,918,217 discloses a reverse osmosis separation process, wherein an effectiveness of membrane cleaning can be estimated. Exemplary embodiments operate the reverse osmosis membrane cleaning process for a controlled time for cleaning and with a controlled value of chemical concentration in a chemical liquor prepared for cleaning the membrane.

US 2019/0184343 relates to a computer-readable recording medium having recorded thereon a clogging location determination program for a separation membrane module (abstract).

WO 2010/109265 A1 discloses a method which includes receiving fouling parameters of a membrane by a mathematical model and providing an objective function from the mathematical model to an optimizer. Further, the method includes optimizing the objective function by manipulating decision variables by the optimizer. The method includes estimating optimal parameters by the optimizer. Further, the method includes rendering the optimal parameters as set points for one or more control variables by the optimizer. The method also includes controlling the membrane filtration process based on the set points with conditions of the membrane as constraints WO 2016/025590 discloses a filtration system which can comprise a pressure pump configured to apply a pressure on fluid flowing between a first chamber and a second chamber. The filtration system can also comprise a flow sensor configured to determine at least one parameter associated with fluid flowing across a membrane deposited between the first chamber and a second chamber. The filtration system can comprise a pressure sensor configured to determine pressure readings of the fluid flowing from the first chamber to the second chamber. The filtration system can comprise a filtration management system configured to cause the pressure pump to apply a constant pressure on fluid flowing across the membrane for a first predetermined time based on the pressure reading. The filtration management system can be configured to cause the pressure pump to reverse the fluid flow across the membrane based on the at least one parameter for a second predetermined time.

US 2017/0209834A1 discloses an apparatus which includes 1) a filtration device including a filtration module to generate a filtrate from an input stream; 2) a desalination device fluidly connected to the filtration device; and 3) a controller configured to direct operation of the filtration device and the desalination device. In a first mode of operation, the filtration module is configured to perform filtration as part of generating the filtrate. In a second mode of operation, the filtration module is configured to receive an output from the desalination device such that the output backwashes the filtration module.

SUMMARY OF THE INVENTION

According to a first aspect of the present disclosure, there is provided a reverse-osmosis system comprising:

multiple reverse-osmosis assemblies, each reverse-osmosis assembly comprising:

a reverse-osmosis stage having a semi-permeable membrane, a feed inlet, a permeate outlet and a concentrate outlet, wherein the feed inlet is configured to receive feed water having a feed-water flow rate;

a concentrate valve configured to control the pressure of the concentrate outlet;

a sensor array having:
  a feed pressure sensor;
  a feed flow sensor;
  at least one of: a feed salinity and a conductivity sensor;
  a feed temperature sensor;

at least two flow sensors configured to measure at least two of: feed flow, permeate flow, and concentrate flow;

at least one of: a permeate salinity and a conductivity sensor;

a differential pressure sensor configured to measure the difference between the feed pressure and the concentrate pressure; and a permeate pressure sensor; and a controller configured:

to receive information from the sensor arrays;

to calculate, from the received information, one or more of: an A-Value, a B-value and a normalized differential pressure value, for each reverse-osmosis stage;

to determine a fouling parameter for each reverse-osmosis stage based on one or more of: the A-Value, the B-value and the normalized differential pressure value; and to control flow through each of the reverse-osmosis assemblies based on the determined fouling parameters to meet a predetermined criterion for total permeate production for the reverse-osmosis system.

The criteria for total permeate production may comprise a total volumetric rate of permeate production at a particular time. The criteria for total permeate production may comprise a total volume of permeate production over a particular time period (e.g. a day, a week). The system may also be configured to meet quality criteria (e.g. that the produced water is less than a threshold salinity).

The controller may be configured to control the flow through each of the reverse-osmosis assemblies comprises by adjusting a recovery ratio of each of the reverse-osmosis assemblies. The recovery ratio may always be a positive number so that all the assemblies that are being controlled are contributing some permeate to the aggregate production of the system. That is, this system may be configured to ensure that none of the assemblies are taken completely offline. The system may be configured to keep the recovery ratio of each assembly within 10% of the average recovery ratio of all of the assemblies. The system may be configured to ensure that the permeate production of each assembly is at least 10% of the average permeate production of all of the assemblies.

The controller may be configured to control the flow through each of the reverse-osmosis assemblies comprises by adjusting feed flow provided to each of the reverse-osmosis assemblies.

The controller may be configured to enable control of flow through each of the reverse-osmosis assemblies based on the received information and on previous behaviour of the system to meet predetermined permeate flow and permeate salinity criteria and to reduce energy consumption.

The controller may be configured to use machine learning to predict the response of controlling the flow through each of the reverse-osmosis assemblies. For example, machine learning may be configured to predict how the fouling parameter, the normalized differential pressure, the A-value and/or the B-value will change as a function of, for example, permeate production (or time, or input flow) for a particular input flow, recovery ratio and input properties (e.g. salinity and temperature). This may allow the system to control the assemblies to achieve predetermined outcomes. For example, the machine learning may predict, for a particular assembly, that if the recovery rate, input flow and input water quality (salinity, temperature etc.), remain the same fouling will get worse slowly for a particular period and then get worse more rapidly after that period. However, the machine learning may also be able to predict that if the recovery ratio were decreased by an amount, and the input flow were increase by an amount, the fouling would get better at a certain rate. How the system subsequently actually behaves may be used to train the machine learning.

The controller may be configured to increase permeate production of the reverse-osmosis assemblies which have a fouling parameter indicative of less fouling and increase concentrate production of the reverse-osmosis assemblies which have a fouling parameter indicative of more fouling. Increasing concentrate production may lower the concentration of salinity of the concentrate.

The controller may be configured to decrease flow through the feed inlets of the reverse-osmosis assemblies which have a fouling parameter indicative of less fouling and increase flow through the feed inlets of the reverse-osmosis assemblies which have a fouling parameter indicative of more fouling.

The controller may be configured to control the flows through the reverse osmosis assemblies in real time to meet predetermined total permeate flow and total permeate salinity criteria and to reduce cleaning.

The sensor array may comprise an energy sensor configured to measure the energy consumption of the system.

The sensor array may comprise feed temperature sensor.

According to a further aspect, there is provided a method of controlling a reverse-osmosis system comprising:

a reverse-osmosis stage comprising a semi-permeable membrane, a feed inlet, a permeate outlet and a concentrate outlet, wherein the feed inlet is configured to receive feed water powered by a feed pump;

a concentrate valve configured to control the pressure of the concentrate outlet flow;

the method comprising:

measuring a feed pressure;

measuring a feed flow;

measuring a feed salinity and/or conductivity;

measuring a feed temperature;

measuring at least two of: feed flow, permeate flow, and concentrate flow;

measuring a permeate salinity and/or conductivity;

measuring a differential pressure configured to measure the difference between the feed pressure and the concentrate pressure;

measuring a permeate pressure;

determining a fouling parameter for each reverse-osmosis stage based on one or more of: and A-Value, a B-value and a normalized differential pressure value; and controlling the flow through adjust flow through each of the reverse-osmosis assemblies based on the determined fouling parameters to meet a predetermined criterion for total permeate production for the reverse-osmosis system.

According to a further aspect, there is provided a computer program comprising computer program code configured to run in conjunction with a reverse-osmosis system, the reverse-osmosis system comprising:

a reverse-osmosis stage comprising a semi-permeable membrane, a feed inlet, a permeate outlet and a concentrate outlet, wherein the feed inlet is configured to receive feed water powered a feed pump;

a concentrate valve configured to control the pressure of the concentrate outlet flow;

a sensor array having:

a feed pressure sensor;

a feed flow sensor;

a feed salinity and/or conductivity sensor;

a feed temperature sensor;

at least two flow sensors configured to measure at least two of: feed flow, permeate flow, and concentrate flow;

a permeate salinity and/or conductivity sensor;

a differential pressure sensor configured to measure the difference between the feed pressure and the concentrate pressure;

a permeate pressure sensor;

wherein the computer program code is configured to:

receive information from the sensor arrays; and to determine a fouling parameter for each reverse-osmosis stage based on one or more of: an A-Value, a B-value and a normalized differential pressure value; and to control the flow through adjust flow through each of the reverse-osmosis assemblies based on the determined fouling parameters to meet a predetermined criterion for total permeate production for the reverse-osmosis system.

According to a further aspect, there is provided a reverse-osmosis system comprising:

a reverse-osmosis stage having a semi-permeable membrane, a feed inlet, a permeate outlet and a concentrate outlet, wherein the feed inlet is configured to receive feed water having a feed-water flow rate;

a concentrate valve configured to control the pressure of the concentrate outlet;

a sensor array having:

a feed pressure sensor;

a feed flow sensor;

at least one of: a feed salinity and a conductivity sensor;

a feed temperature sensor;

at least two flow sensors configured to measure at least two of: feed flow, permeate flow, and concentrate flow;

at least one of: a permeate salinity and a conductivity sensor;

a differential pressure sensor configured to measure the difference between the feed pressure and the concentrate pressure; and a permeate pressure sensor; and a controller configured:

to receive information from the sensor array; and to determine a fouling parameter based on one or more of: an A-Value, a B-value and a normalized differential pressure value; and to calculate how the fouling parameter would change as a function of permeate production for various flow rates through the feed inlet and recovery ratios, based on previous behaviour of the system.

The system may be configured to calculate an estimate of when an inflection point will occur in the fouling parameter as a function of cumulative permeate flow due to membrane fouling based on previous behaviour of the system.

The system may be configured to calculate the future energy consumption of the reverse-osmosis system based on the estimated inflection point; and to determine the optimum time to clean the reverse-osmosis stage, based on the calculated future energy consumption.

The system may be configured to calculate an estimate of when a change will occur in the rate of change of fouling parameter as a function of cumulative permeate flow due to membrane fouling based on previous behaviour of the system.

The system may be configured to provide an indication of when the change in the rate of change of the fouling parameter will occur. The system may be configured to provide an time of when cleaning should occur, the provided time being before the predicted change in the rate of change of the fouling parameter. The system may be configured to automatically initiate cleaning at a time before the predicted change in the rate of change of the fouling parameter.

How the fouling parameter would change as a function of permeate production is based on one or more of: the feed salinity and the feed conductivity.

The system may be configured to adjust the recovery ratio of any of the reverse osmosis stages by at most about +/−5% about a central recovery ratio. For example, if the data shows that if the recovery is 40%, it may adjust it to between 35% and min 45%.

The fouling parameter may be the A-value. The fouling parameter may be the B-parameter. The fouling parameter may be a Normalized Differential Pressure value. The fouling parameter may a combination of these values. The fouling parameter may be configured such that an increase in the A-value and a decrease in the B-value both result in a change of the fouling parameter of the same sign (i.e. both positive or both negative, because both are associated with an increase in fouling).

Historical data may be transferred to a remote computer (e.g. a data warehouse). The following parameters to be input into the system: feed conductivity or salinity, feed temperature, feed pressure, feed flow, permeate flow, permeate conductivity or salinity, differential pressure, permeate backpressure, cleaning event time and energy usage for the total plant and energy usage for the RO unit process.

This data may be cleaned to remove spurious data, errors and zero values. This may be performed automatically using a computer program.

The clean data may be used to calculate A-Value and B-Value that deal with the intrinsic water flux (A-Value) and intrinsic salt flux (B-Value) of the membrane surface. The clean data may be used to calculate a normalized differential pressure.

RO membranes do not have pores, rather they are semi permeable to salt. Hence salt is actually absorbed into the body of the membrane and transported from the salty side to the clean side. "Salt removal" occurs because the speed of the water transport is far faster than the speed of the salt transport across the membrane. So, the B-Value is a measure of the speed at which salt absorbs into the membrane and is transported to the other side.

The clean data is used to train the ML algorithms, creating specific algorithms for each site. Historical data may be used to train the algorithms. In the context of this invention, calculated A- and B-Values are important to training. This is unusual in ML training. ML scientists usually only employ raw collected data.

The system applies 3 main components to solve the problem as detailed: training of a machine learning model with historical A-Value's and permeate production, simulating future operating conditions and costs using the trained machine learning model, and optimizing the best point in time to perform cleaning by selecting the lowest cost operating future simulated by the trained model.

In the training component, historical RO membrane performance data is utilized to learn the dynamics of membrane fouling specific to the set of membranes being optimized. The system may be able to model and estimate the seemingly random nature of membrane fouling dynamics bespoke to individual or sets of RO membranes. A major difficulty in predicting membrane fouling is the seemingly random occurrence of inflection points in membrane performance during operation, where membrane performance suddenly and unexpectedly degrades rapidly. The present system may be configured to predict this seemingly random point of inflection.

In the context of this disclosure, an inflection point may be considered to be a rapid or a step change in the gradient of a graph of fouling parameter, A-value, B-value and normalized differential pressure (e.g. with respect to time or total permeate production). For example, a change of at least 1% within 1 day of the A-value would be considered to correspond to a rapid change in A-value indicative of an inflection point. Rapid changes in the values indicative of fouling listed above (e.g. fouling parameter, A-value, B-value and normalized differential pressure) typically happen in over a period of time lasting between 1 day and 1 week (normally within 2-3 days). The gradient of the values before the inflection point is typically stable for at least several weeks (e.g. 4 weeks), and may be stable for several months or more.

In the simulation component, the trained machine learning model is utilized to simulate future cleaning events by using the trained model to predict membrane performance under each cleaning event condition. This membrane performance may then be related to an associated energy cost which is used to calculate the cost of operating under the predicted performance conditions for each possible cleaning event.

The optimization component may use the results of the simulation component to select the clean event time the results in the lowest total operating cost (the sum of energy costs and cost of cleaning) to produce a specified amount of permeate. The cleaning time that results in the minimum total operating cost is the optimized time for cleaning recommended by the system.

The system may apply the method continuously, re-optimizing as new daily operating data is collected, using all available operating data to maximize the system's ability to capture the specific fouling dynamics of the RO membranes being optimized.

The reported cleaning time is either transferred to the operator by email or automatically to their SCADA. If set points are transferred by email, the operator physically notes the time to clean and schedules accordingly. If transferred directly to the SCADA, cleaning time appears on a SCADA screen as a forecast and triggers an alarm closer to the time for a clean.

The system may be particularly advantageous in systems where feedwater quality to an RO changes substantially (e.g. in breweries, dairy and oil and gas). Additionally, brackish groundwater plants that are affected by saltwater intrusion dynamics in the aquifer, meaning salinity changes with time. Plants that are affected by algae bloom may find this extremely helpful. This would also be helpful for predicting backwash times for filters in desal plants and conventional water treatment plants.

The sensor array may comprise a Silt Density Index recording device configured to measure the fouling state of the feed water to the RO.

The controller may be configured to receive information from the sensor array and determine the permeate flow, the permeate salinity and the energy use.

The controller may be configured to enable control of the feed-water flow rate and the position of the concentrate valve based on the received information to meet predetermined permeate flow and permeate salinity criteria and to reduce energy consumption.

It will be appreciated that the position of the concentrate valve may be considered to control the flow rate of liquid through the concentrate valve.

It will be appreciated that salinity and conductivity measurements may be interchangeable in that they both are a measure of the salt content within the flow. The salinity criteria may be expressed in terms of salinity and/or conductivity.

The feed-water flow rate may be controlled by controlling the speed of a feed pump and/or controlling a feed valve. The feed valve may be positioned downstream of the feed pump and upstream of the reverse-osmosis stage. For example, the feed water can be drawn by the feed pump and pumped through the feed valve. After the feed valve, the sensors would detect the flow parameters (e.g. pressure and/or flow rate) before being directed into the reverse-osmosis stage. The role of the feed valve is to control the feed pressure and may be used when there is no variable frequency drive on the feed pump.

The feed pump may comprise one or more pumps located in the line directly between the water source and the reverse-osmosis stage (e.g. which does not pass through an energy recovery device).

The feed inlet may be configured to receive feed water powered by a combination of the feed pump and power harvested from the concentrate outlet flow via an energy recovery device. It will be appreciated that some embodiments may have a feed pump but no energy recovery device.

The system may be configured to reduce the energy consumption for continuous operation of the system, given the configuration of the physical components of system rather than identifying issues with the system and repairing them (e.g. fouling of the reverse-osmosis membranes).

The system may comprise a booster pump configured to provide additional pressure to the feed water passing through the energy recovery device, and wherein the controller is configured to control the pressure and/or flow applied by the booster pump (e.g. to meet the predetermined criteria and reduce the overall energy consumption). A booster pump may comprise one or more pumps located in the line between the water source and the reverse-osmosis stage which passes through an energy recovery device.

The energy recovery device may comprise a spinner, rotor, a twin turbine or a piston arrangement.

The controller may be configured to enable control of the speed of the feed pump and the position of the concentrate valve based on the received information and on previous behaviour of the system to meet predetermined permeate flow and permeate salinity criteria and to reduce energy consumption. This may mean that the set points determined by the controller may be different for the same set of received information as the controller learns how the device behaves. This may also allow a controller to adapt to a particular reverse-osmosis system over time. For example, if two systems started with identical controllers, the response of the controllers may start to diverge as the controllers learned the particular behaviour of the two systems.

The controller may be configured to determine the water flow and the salt flow through the semi-permeable membrane, and to use these determined values to determine the feed flow rate and the position of the concentrate valve. The water flux and the salt flux values may correspond to the A- and B-values of the membrane. Using these determined values, rather than simply raw sensor data, may allow the controller to determine better configurations of the feed flow rate and concentrate valve position more quickly to reduce energy consumption.

The controller may be configured to use machine learning to determine the control of the feed-water flow rate, the speed of the feed pump and/or the position of the concentrate valve.

The controller may be configured to calculate predicted values for permeate flow, the permeate salinity and the energy use for particular configurations of the feed-water flow rate, the speed of the feed pump and/or the position of the concentrate valve based on previously received sensor array data.

The controller may be configured to control the feed-water flow rate, the speed of the feed pump and/or the position of the concentrate valve to be at values corresponding to the minimum energy use to meet predetermined permeate flow and permeate salinity criteria.

The controller may be configured to vary the the feed-water flow rate, the speed of the feed pump and/or the position of the concentrate valve around values corresponding to the minimum energy use to meet predetermined permeate flow and permeate salinity criteria; and refine the predicted values based on discrepancies between the predicted values and the measured values from the sensor array for particular configurations of the the feed-water flow rate, the speed of the feed pump and/or the position of the concentrate valve. That is, for the same received information, the controller may be configured to move through a series of different set points (e.g. feed pump speed and concentrate valve position) in sequence. The response of the system can then be used to refine the learned behaviour of the system.

The range of configurations explored may correspond to set points which are predicted by the controller to satisfy the permeate flow and permeate salinity criteria and have a predicted energy consumption within a predetermined range of the minimum predicted energy configuration which meets the permeate flow and permeate salinity criteria. For example, the range of configurations may correspond to configurations with a predicted energy consumption within 5% (or 1%) of the minimum predicted energy consumption (e.g. which meets the permeate flow and permeate salinity criteria).

The controller may be configured to alert the operator if discrepancies between the predicted values and the measured values from the sensor array for particular configurations of the speed of the feed pump and the position of the concentrate valve exceed a predetermined threshold.

The controller may be configured to control the the feed-water flow rate, the speed of the feed pump and/or the position of the concentrate valve in real time to meet predetermined permeate flow and permeate salinity criteria and to reduce energy consumption. Real time may mean receiving updated information and adjusting the system configuration frequently (e.g. every hour, every minute or continuously). The frequency of monitoring received information and adjusting the system may be fast relative to the changes in the input feed.

The sensor array may comprise an energy sensor configured to measure the energy consumption of the system.

The controller may be configured to calculate a measure of the energy consumption of the system (e.g. based on the measured flow rates and/or the configurations of the pumps).

The reverse-osmosis train may comprise multiple permeate outlets, and the sensor array may have a respective permeate salinity sensor for each outlet.

The system may control the feed pump by controlling a feed valve. The system may control the feed-water flow rate by controlling the feed pump and/or a feed valve.

The system may comprise a permeate valve, which may also be controlled by the controller (e.g. to effect energy savings).

The permeate pressure sensor may be configured to make a one-time measurement of the permeate pressure which is provided to the controller and is used as a constant for subsequent determinations by the controller of the permeate flow, the permeate salinity and the energy use.

The received information may comprise time information. The controller may use the time information to determine temporal patterns. For example, the system may experience a daily cycle due to temperature changes and/or demand changes.

The sensor array may comprise a feed temperature sensor.

The method may comprise:

determining the permeate flow, the permeate salinity and/or conductivity and the energy use based on the measured parameters, and enabling control of the feed-water flow rate and the position of the concentrate valve to meet predetermined permeate flow and permeate salinity criteria and to reduce energy consumption.

The membrane may be a thin film composite (TFC) membrane. The membrane may be a thin film nanocomposite (TFN) membrane or any other surface determined to partition water and salt.

The feed pump may comprise a low-pressure pump and/or a high-pressure pump.

The high-pressure pump may be powered by a Variable Frequency Drive (VFD).

The reverse-osmosis stage may comprise two permeate outlets (e.g. a front and rear outlet). The flow from these outlets may be combined and the various parameters measured on the combined flow. In other embodiments, each permeate outlet may comprise its own set of sensors. In other embodiments, some parameters may be measured independently (e.g. salinity), whereas others may be measured in aggregate (e.g. pressure). The reverse-osmosis stage may be configured such that the permeate is configured to exit from only one of the front and rear outlets or from both outlets.

The system may be a one-stage or a two-stage or a multiple-stage reverse osmosis system. In a one stage reverse osmosis system, the feed water enters the reverse osmosis system as one stream and exits the reverse osmosis system as either concentrate or permeate water.

In a two-stage system the concentrate (or reject) from the first stage then becomes the feed water to the second stage. The permeate water collected from the first stage is combined with permeate water from the second stage. Additional stages increase the recovery from the system.

The system may comprise a concentrate recycle conduit configured to take a portion of the concentrate stream and feed this back to the feed water to the first stage to help increase the system recovery.

Fouling occurs when contaminants accumulate on the membrane surface effectively plugging the membrane. As certain dissolved (inorganic) compounds become more concentrated then scaling can occur if these compounds exceed their solubility limits and precipitate on the membrane surface as scale. Mechanical damage to the membrane includes physical damage to the membrane and may be caused by over-pressurising the reverse-osmosis stage. Any changes to the membrane may affect the salt transmission (B-Value) through the elements and/or the water transmission (A-Value) through the elements.

B-Value may not always be relevant to the current fouling state, but to predict when to clean for all types of fouling (such as organic fouling, mineral scaling, colloidal fouling, metal oxide fouling and biological fouling). For example, the B-value might track for years with no impact and then a mineral scaling event occurs, making B-value very relevant.

Table 1 of Nitto™ Hydranautics™ Technical Service Bulletin, December 2014, TSB107.24, URL: https://membranes.com/docs/tsb/TSB107.pdf) lists the factors that will change during RO fouling. According to this table we will see a marked increase in B-Value (Salt Passage) when Mineral Scaling is the problem. Therefore, the B-value may be important to monitor and predict when mineral scaling is an issue.

A reverse osmosis membrane may refer to a sheet of material configured to perform the actual desalting. A reverse osmosis element may refer to an assembly comprising a reverse osmosis membrane. It is common that a reverse osmosis element is a spiral of membrane material which is fiberglassed and is ready for installation into, or has already been installed within, a pressure vessel.

The pressure exchange device or energy recovery device may comprise a Pelton wheel. A Pelton wheel is an impulse-type water turbine which extracts energy from the impulse of moving water. A Pelton wheel system may be optimized by controlling a feed valve rather than a VFD on the feed pump.

A computer program may be stored on a non-transitory medium such as a CD or a DVD. A computer program may be stored on a USB or in the cloud. Computer programs may be configured to carry out one or more of the methods disclosed herein.

The controller may comprise processing components remote from the reverse osmosis stage. The remote processing components may be in communication with the sensors and the controlled components (e.g. pump(s), concentrate valve) via wired and/or wireless communication links.

The methods and systems may employ artificial intelligence (AI) techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning). The methods and systems may use reinforcement learning, deep neural networks and/or recurrent neural networks.

The computer may operate in a networked environment. A remote computing device may comprise a personal computer, a server, a portable computer (e.g., laptop, mobile phone, tablet device). Connections between the computer, controller and/or a remote computing device may be via a network, such as a local area network (LAN) and/or a general wide area network (WAN). The computer may be connected to or part of a cloud-computing system.

The machine learning may use supervised or unsupervised learning which comprises learning a function that maps an input to an output based on example input-output pairs. It may involve inferring a function from labeled training data consisting of a set of training examples. In supervised learning, each example is a pair consisting of an input object (e.g. measured sensor data) and a desired output value (e.g. output flow, salinity, energy consumption). A supervised learning algorithm may be configured to analyze the training data and produces an inferred function, which can be used for mapping new examples. Unsupervised learning could be used to identify the sensor data and find errors in the data.

To simulate the effect of changing plant conditions the machine learning may use a Feed Forward Neural Network (FFNN). The FFNN is a network of neurons and has weighted edges between neurons. Neurons are organized in layers where each neuron in the current layer is connected to every other neuron in the next layer. The "activation" of any given neuron is based on the weights of the connections and the activation of the neurons in the previous layers. This is represented mathematically with the weight of the connection being a coefficient in the value of the activation of the corresponding neuron. A backpropagation algorithm optimizes the network so that when the input data is represented in input neuron activations, the output neuron activations is our desired output. The machine learning may represent this structure by making each layer a vector and using the alternating direction method of multipliers (ADMM) algorithm to perform backpropagation.

The Machine Learning uses many different factors that may not be apparent from simply using conventional calculations in the controller. Using Machine Learning (or any control based on past behaviour) means that the set points (e.g. feed pump speed and concentrate valve position) may change or be different for the same set of inputs (e.g. measured sensor values). This is in contrast to a controller which is based on a calculation, in which the same set points will be calculated for the same set of inputs.

The controller may receive information corresponding to the time (e.g. time of day, time of year). The Machine Learning may use time as an input for the set point predictions and calculations. Experimentation has shown that water quality is very dependent on the current season as weather patterns and temperature can have a tangible effect on the optimum set points of the plant. The sensor array may comprise a thermometer configured to measure the temperature of the feed water.

The controller may be configured to enable control of the speed of the feed flow rate, the feed pump and/or the position of the concentrate valve based on the received information (e.g. from the sensor array and/or that associated with time) to meet predetermined permeate flow and permeate salinity criteria and to reduce energy consumption.

Other factors that the present system may account for are the efficiency of plant components, such as pump efficiency, membrane conditions, energy recovery device efficiency, that are not modeled in a conventional controller approach. The machine learning can make set point predictions that account for such factors without an explicit mathematical model. This allows the system to be much more robust to changes in the plant and try set points that a normal controller may miss. Additionally, the machine learning will adapt with time. While it will predict a good optimized set point for one particular time, it will gain more energy efficiency as the system collects more data and further learns.

Differential pressure (DP) is generally proportional to flow. This flow (and temperature) dependence can be removed by normalizing the differential pressure to calculate the normalized differential pressure. This means that the same system should have the same normalized differential pressure regardless of flow (and possibly regardless of temperature). Normalized differential pressure, NDP, may be calculated as follows:

$$NDP = DP \times \left( \frac{(\varphi_{ref}/2)^{1.6}}{(\varphi_{measured}/2)^{1.6}} \times 1.03^{(T_{feed} - 25°C)} \right)^{0.4}$$

where $\varphi_{measured}$ is the flow rate measured at the time, $T_{feed}$ is the temperature of the feed, and $\varphi_{ref}$ is the reference feed flow rate and represents a "zero" point the operator chooses to work from. For example, it could correspond to when then membranes were first brought online, or it could be from the last clean.

The controller may comprise a processor and memory. The memory may store computer program code. The processor may comprise, for example, a graphics processing unit, a central processing unit, a microprocessor, an application-specific integrated circuit or ASIC or a multicore processor. The memory may comprise, for example, flash memory, a hard-drive, volatile memory.

BRIEF DESCRIPTION OF THE DRAWINGS

The invention is described with reference to the drawings in which:

FIG. 2 is a flow chart showing how the system controls the reverse-osmosis system.

DESCRIPTION OF THE INVENTION

Overview

Figure 1A:
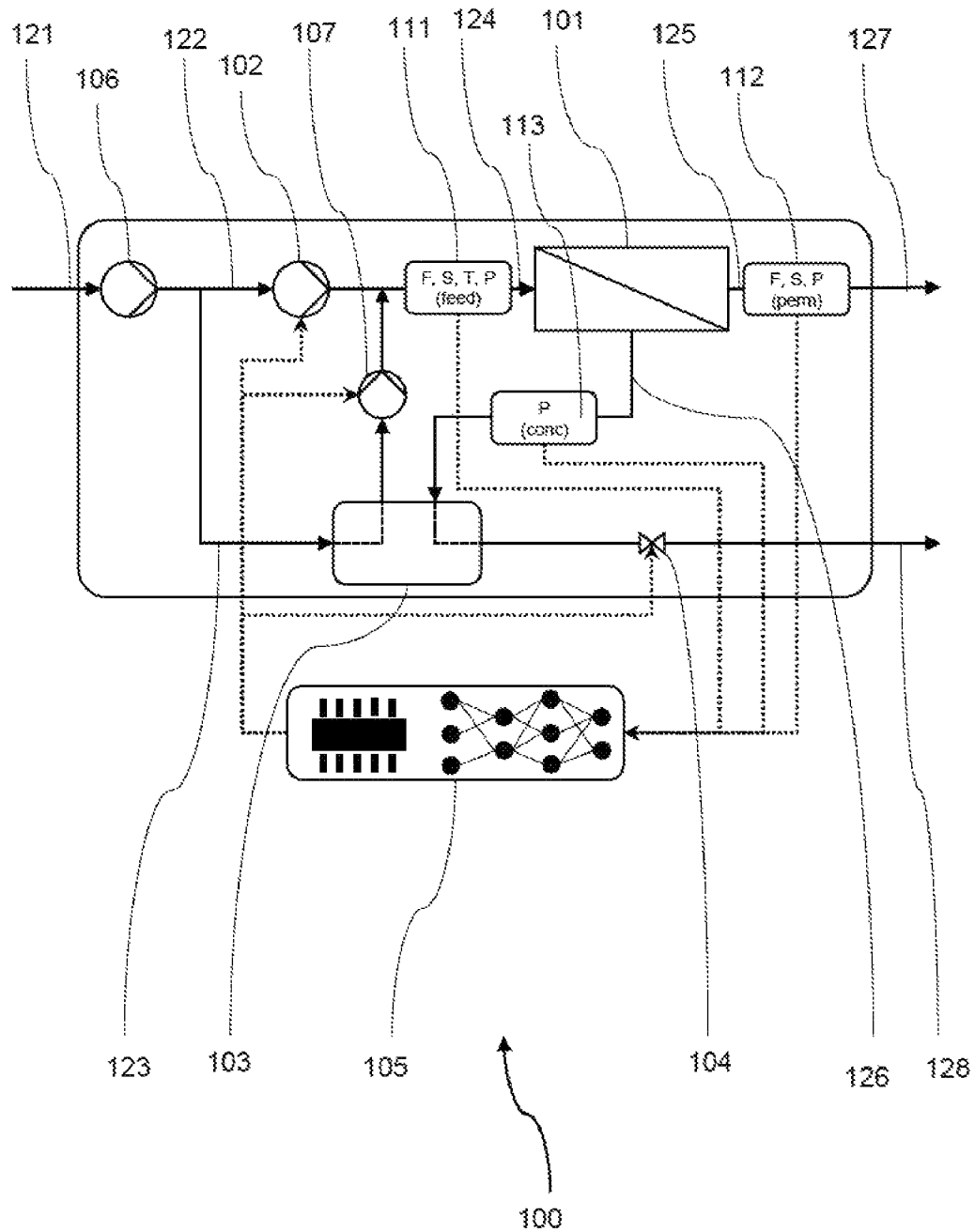
FIG. 1a is a schematic diagram of an embodiment of a reverse-osmosis assembly.

The present technology relates to desalinating water using Reverse Osmosis. Reverse Osmosis involves pumping salty water through a semi-permeable membrane (one which is much more permeable to water than to salt). The pressure means that water molecules are driven through the semi-permeable membrane much more quickly than the salt ions. In this way, the raw or feed water supply (e.g. from the sea) is separated into a clean water (permeate) output and a concentrate output which is even more salty than the raw/feed water.

Reverse Osmosis systems may comprise: a reverse-osmosis unit comprising a semi-permeable membrane, a feed inlet, a permeate (clean water) outlet and a concentrate (salty water) outlet; wherein the feed inlet is configured to receive feed water powered by a combination of a feed pump and power harvested from the concentrate outlet flow via a pressure exchange; and a concentrate valve configured to control the pressure of the concentrate outlet flow as it passes through the pressure exchange.

In accordance with the present disclosure, the sensor array will typically have:
  a feed pressure sensor (the feed relating to the water entering the Reverse Osmosis Unit after the pump and pressure exchange);
  a feed flow sensor;
  a feed salinity/conductivity sensor;
  a feed temperature sensor;
  an output flow sensor configured to measure at least one of the permeate (clean) flow and the concentrate (salty) flow;
  a permeate salinity/conductivity sensor;
  a differential pressure sensor configured to measure the difference between the feed pressure and the concentrate pressure; and
  a permeate pressure sensor.

It will be appreciated that some embodiments may include additional sensors such as pH sensors, temperature sensors, Oxidation-Reduction Potential (ORP) sensors and/or energy sensors.

It will be appreciated that some parameters may be directly measured by a sensor or calculated from a combination of multiple sensor inputs. For particular embodiments, some of the parameters may be fixed and so one initial measurement may be sufficient. That is, continuous monitoring of that parameter may not be required. For example, the permeate pressure may be kept constant for a particular set-up and so would not need to be continuously monitored.

Typically, a Reverse Osmosis system will have predetermined requirements. For example, it must produce enough water for the population (or industrial site) that it is serving. Likewise, for example, the produced water must be sufficiently pure, for example, to be drinkable (or to be used in a particular industrial process). In addition, the system must generally be configured to produce water of sufficient purity to meet predetermined local water quality guideline/restriction values. Then, the system is configured to satisfy these requirements while facilitating or reducing cleaning (e.g. in real time).

The technology described in this disclosure generally relates to the optimization of a reverse osmosis (RO) system to minimize cleaning frequency and therefore costs associated with cleaning (e.g. chemicals, downtime, labour etc.). Chemical cleaning for reverse osmosis systems is ubiquitous and can range from an annual occurrence to weekly. The present technology may apply machine learning algorithms to analyze the plant's energy use with respect to the performance of the plant (e.g. water flux and salt rejection) as well as the frequency of cleaning.

The output of the machine learning may include an optimum cleaning date based on the minimization of cleaning costs and increased energy costs due to fouling. These set points are delivered via software either to the operator directly or to the SCADA system to automatically control the time to perform a clean. The forecast date for a cleaning event is communicated to the plant on a daily basis and this date will vary a slight amount every day, until it is possible for the operators to perform a clean.

In addition, the technology may help reduce the amount of cleaning required by adjusting flow through the reverse osmosis stages to reduce fouling.

In addition, the technology may help reduce the amount of energy used per unit of water produced. Energy efficiency is extremely important in desalination, as energy costs can be as high as 30-40% of the total operational costs.

A problem with planning cleaning for reverse osmosis trains stems from the apparent random nature of when a cleaning should be performed. Changing feed water conditions make it difficult to manually forecast the best time to clean. When coupling this with minimizing energy costs simultaneously, the math generally becomes too difficult to perform on a daily basis. In many cases operators lack experience to determine the best time to clean, and in many cases leave cleaning far too late, causing massive cost over runs due to the increased need for energy due to fouling. Many operators lack the confidence to know when to clean and frequently contact their membrane supplier for advice.

It is also very difficult to predict the intrinsic water flux (A-Value) and intrinsic salt flux (B-Value) will be on any given day for any given set point combination. This makes optimization a long process that is sometimes beyond the skill set of operators.

Subsequently, plants become inefficient as operators have too many jobs to do on site to afford time to spend optimizing their cleaning schedules.

Advantages

Conventionally, a human user would set up a Reverse Osmosis system and calculate the settings required for optimum performance (e.g. reduced energy for water production, and reduced cleaning requirements). These settings would not typically be changed even if there were changes in the feed (e.g. temperature or flow). Machine learning may mitigate the need for lengthy calculations.

Using the differential pressure across the membrane is the current industry standard parameter utilized in making a decision to apply chemical clean. After extensive data analysis and modeling attempts, the inventors realized that differential pressure did not always contain enough intrinsic information about the RO system to sufficiently model its fouling dynamics. Differential pressure across a membrane can have too many extraneous sources of influence beyond just fouling conditions, such as the instantaneous rates of production, operating temperatures and feed water characteristics to capture the impact by fouling specifically. Although multiple machine learning techniques were applied in attempt to capture membrane fouling dynamics using differential pressure, in some cases real world data may be too noisy to build a workable system.

The inventors discovered that using derived reverse osmosis membrane parameters such as A-Value B-values and/or normalized differential pressure correspond more accurately and reliably to the fouling state of the membrane. A-Value in particular proved to be a reliable predictor of membrane fouling dynamics, with acceptable levels noise and more consistent trends.

Multiple machine learning techniques were applied on this new derived dataset, the first of which was a linear model, capturing the decrease in A-Value as a function of permeate production. Although the applied technique worked better than the previous approaches, the prediction error was still relatively large. In investigating the source of this large error, the inventors observed a consistent occurrence of an inflection point in an RO membrane's A-value, where A-Value takes a sudden and rapid decline in performance after a period of operation.

This led to the development of the presently described system, where a piece-wise linear model is used to predict both the timing of this inflection point and the associated slopes of the A-value performance before and after this inflection point. They system may model future performance as two sequential linear functions in the form of function A, $y=m_1x+c_1$, and function B, $y=m_2x+c_2$, where the model automatically determines when to switch from using function A to function B to best model the data. y in this case may be taken to be a fouling parameter and/or the A- and/or B-values themselves. x may be the cumulative produced volume of the assembly. More functions may be used to model the performance more precisely. More functions may be used to model the performance more precisely.

For clarity, an inflection point in this context corresponds to the point of increase in y that an expert RO operator would determine as the point at which a membrane began to be sufficiently fouled to justify a clean. The system described automates both the future prediction and determination of this inflection point using the aforementioned mathematical model. The ability of the system to predict this inflection event before it occurs allows for the prevention of irreversible fouling of an RO membrane and the optimization of RO membrane cleaning and energy operating costs. This approach greatly exceeds the performance of the previously attempted approaches and reduced the prediction error sufficiently to adequately use in optimizing the best time to apply chemical cleaning for specific RO membranes under current operating dynamics.

Generally, in RO plants, any decision on when to clean is made on when a plant's normalized permeate flux reduces by 10% (as above). A graph of normalized permeate flux vs time is used. The inventors have discovered that more robust comparison is A-Value vs water produced, which gave a far superior decision tool.

Another shortcoming of current plant operation is that a fixed recovery rate is adopted across all trains in a plant and is seldom varied. By manipulating recovery more frequently and balancing flows across multiple trains, energy and chemicals can be saved. For plants with more than 2-3 trains, it is impossible for operators to manipulate and optimize flows by constantly varying recovery. Some systems may typically have up to or between 20-30 trains (sometimes up to 60 trains or more).

Analyses by the inventors have shown that there may be significant energy savings yet to be realised through the application of machine learning to RO. For example, in a seawater system operating with industry standard seawater reverse osmosis elements and a pressure exchange and with feedwater conditions 38,000 ppm salinity and at 20° C. the energy use was 2.2 kWh/m³. In a particular scenario, the feedwater salinity changes to 32,000 ppm and the temperature changes to 30° C. In order to maintain the target permeate flow and target permeate salinity, the system conditions must be changed. The machine learning analyzes the historic data to establish the best set points at these feed conditions and membrane permeability and rejection properties. To meet the permeate flow and permeate salinity constraints of the plant, the high-pressure pump is increased 7%, the booster pump is increased 5.5%, and the concentrate valve is adjusted accordingly to avoid over flush and create balanced flow. In this scenario the new energy use is 1.85 kWh/m³ or approximately 20% energy saved. If the plant was not optimized in this case, the permeate salinity constraint would be exceeded.

In addition, machine learning automatically addresses problems relating to assumptions made in the calculations which are incorrect (or not quite accurate), and machine learning can more easily take into account changes in the system configuration (e.g. if a pressure exchanger, pump or reverse osmosis membrane is replaced or maintained, the machine learning could learn to compensate for the different characteristics of the new component).

The system may reduce fouling. Fouling is dependent on the ratio of cross flow velocity to permeate flow. When permeate flow is high and cross flow low, fouling can occur. When permeate flow is low and cross flow is high, fouling may be alleviated (with a raising of A-value and/or a lowering of the B-value). This is not a technique currently used as an anti-fouling mechanism by industry. Typically, one recovery ratio (permeate flow/feed flow) is set and never changed. In the present technology, the algorithm manages the fouling between trains and the recovery ratio is constantly manipulated. The system may typically be adjusted once a day, once an hour or more frequently. One train will see an increased flux and allowed to foul slightly, while another will see a decreased flux or be in an 'anti-fouling' mode. Trains are usually started at the same time, but not cleaned at the same time, so performance between trains can be very different.

Additionally, by collecting the SDI metric, the machine learning will trigger to decrease recovery across all trains when the feed water decreases in quality, thus evenly mitigating the fouling risk to the entire plant during those periods of high fouling risk.

The positive feature is the ability of the machine learning to infer context from the plant's historic data by learning a latent representation for the state of the plant that is capable of capturing the underlying physical relationships between the plant's process variables without the need for explicit standard mathematical equations. This makes the system robust to the unavailability over long time periods of some process values, such as feed solution ion concentrations, as the system can automatically infer these values through its learned relationships from the other available process measurements.

Reverse Osmosis Assembly

FIG. 1 shows an embodiment of a reverse-osmosis assembly 100. The reverse-osmosis 100 in this case comprises:

a reverse-osmosis stage 101 comprising a semi-permeable membrane, a feed inlet 124, a permeate outlet 125 and a concentrate outlet 126;

wherein the feed inlet 124 is configured to receive feed water powered by a combination of a feed pump 102 and power harvested from the permeate outlet flow via a pressure exchange 103; and a concentrate valve 104 configured to control the pressure of the permeate outlet flow as it passes through the pressure exchange 103.

The reverse-osmosis assembly is fed by an assembly feed inlet 121 and produces an assembly permeate stream outlet 127 and a assembly concentrate stream outlet 128. The sum of the flow rates through the permeate stream outlet and the concentrate stream outlet will equal the flow into the assembly through the inlet feed line. Therefore, in an assembly as shown in FIG. 1a, there are two ways of adjusting the flow: changing the total volume of flow by changing the rate at which raw water is introduced into the assembly via the inlet feed line; and adjusting the recovery ratio by adjusting how the produced is split between the permeate and concentrate stream outlets. These two values can be controlled by adjusting the pumps and valves within the assembly 100.

However, a predetermined inlet flow rate and recovery ratio may be obtained using a variety of combinations of pump rates and valve positions. The system may be configured to use the combination which gives the predetermined outcome with the lowest energy consumption.

The reverse-osmosis stage 101 consists of a pressure vessel with a semi-permeable membrane that allows water from the feed inlet to be pressed against it. The membrane is configured to withstand the pressure that is applied against it (e.g. between 15-1200 psi for any RO system, and in particular between 700-1200 psi for seawater systems; 15-600 psi for brackish water systems). The maximum pressure may be 1200 psi. Reverse osmosis membranes may be made in a variety of configurations, with the two most common configurations being spiral-wound and hollow-fiber.

Only a part of the saline feed water pumped into the membrane assembly passes through the membrane with the salt removed. The remaining "concentrate" flow passes along the saline side of the membrane to flush away the concentrated salt solution to the stage concentrate outlet 126. The percentage of desalinated water produced versus the saline water feed flow is known as the "recovery ratio". This varies with the salinity of the feed water: typically 40%-50% for larger seawater systems, and 80%-85% for brackish water. The concentrate flow is at typically only 20-50 psi less than the feed pressure, and thus still carries much of the high-pressure pump input energy. For example, if the feed inlet pressure is 800 psi, the concentrate outlet pressure may be 780 psi (with a pressure differential of 20 psi).

Because the pressure in the concentrate 126 is relatively high, energy can be harvested from the concentrate flow in order to pressurise at least a portion of the feed water. Energy recovery can reduce energy consumption by 50% or more. Much of the high-pressure pump input energy can be recovered from the concentrate flow, and the increasing efficiency of energy recovery devices has greatly reduced the energy needs of reverse osmosis desalination. A pressure exchange or energy recovery device is used in this case to recover energy from the concentrate flow.

The energy recovery device 103 may comprise a turbine, rotor or Pelton wheel comprising a water turbine driven by the concentrate flow, connected to the high-pressure pump drive shaft to provide part of its input power. Typically, these may be hydraulic or positive displacement type such as the ERI PX™, Calder DWEER™ or KSB™ type or other manufacturers. Positive displacement axial piston motors have also been used in place of turbines on smaller systems.

The pressure exchange device may comprise a turbocharger comprising a water turbine driven by the concentrate flow, directly connected to a centrifugal pump which boosts the pressure in at least a portion of the feed line. In the case where a turbo is used, the booster pump may be omitted.

There may be embodiments where no pressure exchange device is used. In such an embodiment, energy recovery device 103, booster pump 107 and channel 123 are not used. Instead, the concentrate outlet is directly connected to valve 104.

The pressure exchange device may comprise an energy recovery pump: a reciprocating piston pump having the pressurized concentrate flow applied to one side of each piston to help drive the membrane feed flow from the opposite side. These are generally simple energy recovery devices to use, combining the high-pressure pump and energy recovery in a single self-regulating unit. These are widely used on smaller low-energy systems. They may be capable of 3 kWh/m$^3$ or less energy consumption.

A concentrate valve 104 is included in this embodiment to control the flow through the pressure exchange device 103. By controlling the concentrate flow through the pressure exchange device, the energy transfer to the feed flow may be improved (or optimized). The concentrate valve is configured to dictate the speed of the concentrate flow.

In this case, the feed inlet is configured to receive feed water powered by a combination of a feed pump and power harvested from the permeate outlet flow via a pressure exchange. That is, in this case, the initial feed line 121 is partially pressurised by an optional low-pressure pump 106. After this, the initial feed line is split into two parallel sections. One direct feed-flow section 122 is pressurised by a high-pressure pump 102 to a high pressure (e.g. 800 psi in this case). Another boosted feed-flow section 123 is pressurised through a combination of passing through the pressure exchange device 103 described above and a booster pump 107. The direct 122 and boosted 123 feed-flow sections are then fed into the inlet 124 of the reverse osmosis stage 101.

In this embodiment, there is a sensor array configured to monitor various parameters of the reverse-osmosis system. The sensor array in this case comprises:
- a feed array 111 having: a feed pressure sensor; a feed flow sensor; a feed salinity sensor; and a feed temperature sensor.
- a permeate array 112 having: an permeate flow sensor; a permeate salinity sensor; and a permeate pressure sensor.
- a concentrate array 113 having: a concentrate pressure sensor.

In this case, the reverse osmosis stage 101 has one stage inlet 124 and two stage outlets 125, 126. Therefore, it will be appreciated that knowing the flow through two of these will allow the flow through the third to be calculated. In this case, the embodiment is configured to measure the flow in the feed inlet 124, and the flow from the stage permeate outlet 125. From these values, the flow from the concentrate may be calculated. In other embodiments, a different set of two flow rates may be measured using sensors or all three flow rates may be measured by sensors.

In this case, an important parameter is the differential pressure between the feed pressure at the stage feed inlet 124 and the concentrate pressure at the stage concentrate outlet 126. In this case, this parameter is calculated by determining the difference between the pressure measured by the feed pressure sensor and the pressure determined by the concentrate pressure. It will be appreciated that there may embodiments which are configured to have one sensor designed to directly measure the pressure differential between the feed and the concentrate.

As will be discussed further below, this embodiment comprises a controller configured to receive information from the sensor arrays 111, 112, 113 and determine the permeate flow, the permeate salinity and the energy use. Based on this information, the assembly controller 105 is configured to control the speed of the feed pump 102 and the position of the concentrate valve 104 to meet predetermined inlet flow rate and recovery ratio. In this case, the assembly controller 105 is also configured to meet predetermined permeate flow and permeate salinity criteria and to reduce energy consumption. The predetermined criteria may be received from a controller which is controlling the overall production of a reverse osmosis system comprising multiple individual reverse osmosis assemblies.

In this embodiment, the controller is also configured to control the speed of the booster pump 107. In other embodiments, the controller may also be configured to control the speed of the low-pressure pump 106 or other pumps and valves in any of the lines. In the embodiment where a turbo is used, the position of the turbo bypass valve may be controlled. In embodiments where no pressure exchange device is used control is of the high-pressure pump 102 speed and the concentrate valve 104; booster pump 107 is not controlled as it is not necessary as this item is not present.

Assembly Controller

In this case, the assembly controller 105 uses Machine Learning to determine the best configuration of the system in order to satisfy the requirements of the use (e.g. particular inlet flow rate and recovery ratio) while reducing energy. Machine learning algorithms may be configured to build a mathematical model of sample data, known as "training data", in order to make predictions or decisions without being explicitly programmed to perform the task. It will be appreciated that operational data may also be used as training data. Training data for our purposes can also be generated from mathematical models and/or generated from existing data.

In this case, historical data is transferred to a data warehouse or other processing facility. The following parameters are input into our system: feed conductivity or salinity, feed temperature, feed pressure, feed flow, permeate flow, permeate conductivity or salinity, differential pressure, permeate backpressure. From these values, the A-value and the B-value are calculated for the membrane of the reverse osmosis stage. In some embodiments, energy usage is calculated, in others it is measured. Other embodiments may also measure or calculate other values, such as the time the data was collected (e.g. the month).

This data may be automatically cleaned, for example, to remove spurious data, errors and zero values. The cleaning may also involve labelling the data or otherwise processing the data so that it can be read and understood by the controller. It will be appreciated that this stage may be omitted if the data are already sufficiently clean.

In this case, the clean data are used to calculate A-Value and B-Values for the semi-permeable membrane. These figures correspond to the intrinsic water flux (A-Value) and intrinsic salt flux (B-Value) of the membrane surface. The calculation of the A- and B-Values may help allow the controller determine energy savings because the energy is more dependent on these values than on the raw sensor figures. This may make a mapping from the A- and B-Values to a predicted energy consumption output easier to find. It may also put the sensors into a better context of the plant because A and B calculations take into account things such as membrane element properties. The calculations for A and B are known in literature (e.g. Dow Filmtec™ Reverse Osmosis Manual, Form No. 609-00071-1009). Other embodiments may be configured to calculate a normalised differential pressure value.

A-Value represents the water permeability or the resulting flux from a specific driving pressure. The A-value is typically directly proportional to the normalized permeate flow. Most manufacturers recommend cleaning the membranes when those parameters drop 10% from the stabilized start-up reference. The A-Value of a particular membrane may decrease due to fouling. A-Value is measured in GFD/psi or LMH/bar, in the International System: $m^2/(m^2 \cdot s \cdot Pa)$.

The B-Value is the salt diffusion rate through the membrane. Every salt has its own B-value for a specific membrane according to it's chemical and physical properties. In some embodiments, B-Values may be calculated for a number of different salts. In other embodiments, the system may be configured to treat all salts as if they were NaCl. The B-value is typically directly proportional to the Normalized Salt Rejection. Most manufacturers recommend cleaning the modules when those parameters increase 10%. The B-Value of a particular membrane may increase due to fouling or membrane degradation (abrasion, oxidation, etc.). B-Value is measured in flux units: GFD/psi or LMH/bar, in the International System: $m^2/(m^2 \cdot s \cdot Pa)$.

Typically, reverse-osmosis membranes do not have pores, rather they are semi-permeable to salt. That is, salt is absorbed into the body of the membrane and transported from the salty side to the clean side. "Salt removal" occurs because the speed of the water transport is much faster than the speed of the salt transport across the membrane. In other words, B-Value is a measure of the speed at which salt absorbs into the membrane and is transported to the other side.

The clean data is used to train the Machine Learning algorithms, creating specific algorithms for each site. Before the data is input into the machine learning algorithms it may be normalized as different sensors have vastly different domains. The normalization methods may include: Min-Max Normalization, Standard Deviation method, power transformations, Length-one Normalization, Z-Score Normalization or other techniques.

Historical data (detailed above) is used to train the algorithms, and then more operational data is used over time to continue to refine the algorithm (e.g. online learning) and to reflect changes in the operational parameters of the system (e.g. membrane and/or pump degradation). A and B-Value are important in some embodiments to provide a more effective the model.

In addition, the system is configured to receive constraints to inform the Machine Learning algorithms where the limits are for permeate flow and permeate salinity.

The Machine Learning algorithms may be configured to calculate a cost function based on a combination of the permeate flow, permeate salinity and energy consumption. For example, the cost function, $\sigma_{Total}$, may be calculated by determining the product of a permeate flow score, $\sigma_{F(Perm)}$, a permeate salinity score, $\sigma_{S(Perm)}$, and an energy consumption score, $\sigma_{Energy}$:

$$\alpha_{Total} = \alpha_{F(perm)} \times \alpha_{S(Perm)} \times \alpha_{Energy}$$

The permeate flow and permeate salinity scores may be a step function, wherein each of the permeate flow and permeate salinity scores is 1.0 within the predetermined thresholds (e.g. set by the operator) and 0.0 when outside the predetermined thresholds. The energy score may be lower for higher energy (e.g. an exponential decay curve). In this example, the system would be configured to determine configurations which increased the cost function.

The Machine Learning feeds an optimizer and set points for the plant are reported. The set points define the settings to control the speed of the feed pump and the position of the concentrate valve to meet predetermined permeate flow and permeate salinity criteria and to reduce energy consumption. The optimizer may use differential evolution, Ant colony optimization and/or Gradient descent.

The reported results are either transferred to the operator by email, or automatically to their SCADA (Supervisory Control And Data Acquisition), or via an intermediary software portal/dashboard. For plants with a pressure exchanger (PX) type energy recovery device, results are reported as "high pressure pump variable frequency device (VFD) setting or flow", "booster pump VFD setting or flow" and "PX device low pressure outlet valve set point". In circumstances where the energy recovery device is a turbo, these become "high pressure pump VFD setting or flow" and "turbo bypass valve set point". In scenarios where no energy recovery device is used at all, these are "high pressure pump VFD setting or flow" and "concentrate valve set point".

If set points are transferred by email, the operator physically makes the changes. Alternatively, the data is transferred directly (e.g. automatically) to the SCADA or automatically via an intermediary software portal or dashboard.

In this technology, we apply machine learning algorithms to analyze the plant inputs (feed salinity, feed temperature) and increase cleaning efficiency through an optimizer that then reports the feed pump set point, the booster pump set point and the concentrate valve set point. These set points may be delivered via software to the SCADA system to enable control of the set points.

Machine learning removes the need for lengthy calculation. Machine learning algorithms may mitigate the need for estimates or calculations. Therefore, they can be applied on a more regular basis (daily, hourly or even every minute).

It will be appreciated that the machine learning is configured to base its determination on associating: calculated or sensor-measured system parameters; output parameters (e.g. permeate flow, salinity and energy consumption); and input parameters (e.g. speed of high-pressure pump, valve position). The Machine Learning may be configured to predict the output parameters for a particular configuration of input parameters.

In some embodiments, the system may be configured to explore a particular subset of input parameters to record the system response in order to better learn the system characteristics. For example, the system may be configured to determine a range of input conditions which provides a predicted power requirement no more than 105% (or 101%) of the optimum predicted power. The system may be configured to vary the input within this subset of possible input conditions in order to determine whether there are better configurations than the predicted optimum input conditions. This may help the learning algorithm better categorise the system. It may also allow the Machine Learning algorithm to adapt to changes in the system (e.g. the membrane degrading or fouling, the pumps becoming less efficient). If discrepancies between the predicted and actual outputs are found, the system may be configured to repeat the steps of predicting the output based on the updated information received from the system.

In some embodiments, the system may be configured to use discrepancies between the predicted and actual outputs to determine whether faults have occurred. For example, if there were a failure in one of the components, the discrepancy between the predicted and actual outputs may be used to alert the operator.

Multi-Assembly Reverse Osmosis System

Figure 1B:
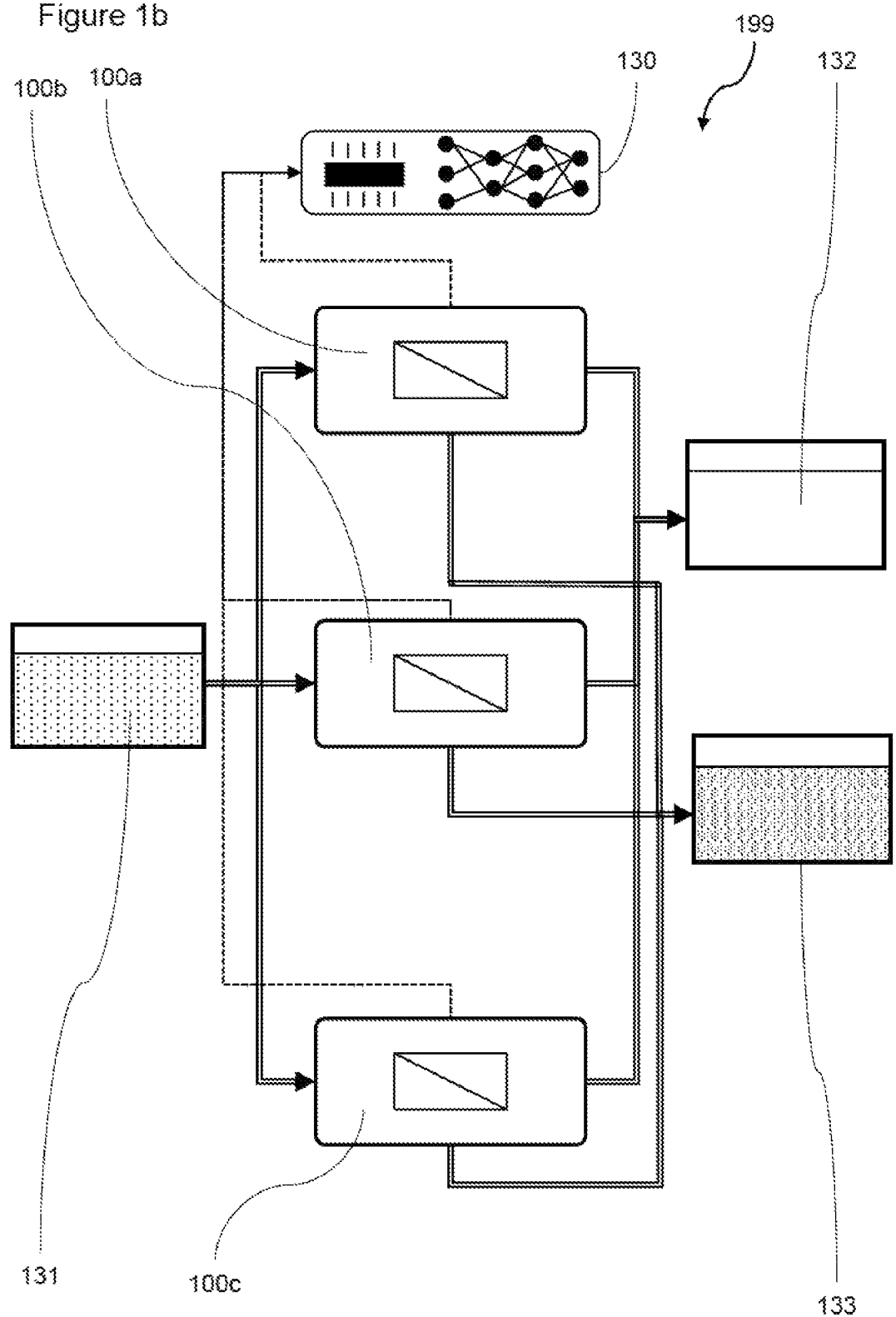
FIG. 1b is a flow diagram showing control of the reverse-osmosis system comprising multiple reverse-osmosis assemblies.

FIG. 1b shows an embodiment of a reverse-osmosis system 199 comprising three reverse-osmosis assemblies 100a-b. The assemblies 100a-b are the same as the assembly 100 shown in FIG. 1a. In this case, the reverse-osmosis system 199 is configured to take water from a raw water source 131 (e.g. the sea) and output cleaned permeate water 132 and concentrate water 133. It will be appreciated that the concentrate water may be returned to the source, if the source is sufficiently large (e.g. the sea). For clarity, for each assembly, the inlet is shown on the left-hand side of the assembly, the permeate outlet is shown exiting the right-hand side of the assembly, and the concentrate outlet is shown exiting the bottom of the assembly.

It will be appreciated that, in this case, the total permeate production is the sum of the permeate produced by each of the reverse osmosis assemblies. Likewise, the total raw water processed is the total amount of raw water provided to each of the reverse osmosis assemblies.

In this case, the reverse-osmosis system 199 comprises three trains. A train is a combination of one or more reverse-osmosis assemblies which take raw water from a source and converts it to a permeate stream and a concentrate stream. In this case, each train comprises a single reverse-osmosis assembly, each assembly having a single reverse-osmosis stage.

It will be appreciated that other configurations may be possible. For example, the permeate from one assembly can be fed to another assembly. This case is called a second pass.

A second pass is common. Multiple passes are used to dramatically reduce permeate salinity.

The concentrate can also be fed to another membrane assembly. This case is called a second stage. A second stage (and sometimes a third stage) is used, especially in brackish waters and occasionally in sea water (for example in estuarine areas where the salinity is lower than regular seawater). Multiple stages are used to maximize plant recovery.

In this case, the reverse-osmosis system 199 comprises a system controller 130. The system controller may comprise each of the assembly controllers or may be in communication with each of the assembly controllers (105 in FIG. 1a). It will be appreciated that adjusting individual assemblies to achieve a particular overall goal (e.g. total water production of a particular purity/salinity) will depend on how the assemblies are linked together. This is taken into account by the system controller.

System Controller

In this case, the assembly controller 130 reduces cleaning and energy use by making more water from trains that are less fouled and less water from trains that are more fouled.

As membranes foul (decreased A-value and/or increased B-value and/or increased normalized differential pressure value), that train will be used less and allowed to recover (A-value will increase and/or B-value will decrease and/or normalized differential pressure value will decrease). When making less water from a train, flux (i.e. water being transmitted through the membrane) will be reduced, and cross flow velocity will be increased (i.e. less permeate is produced and more water flows across the surface of the membrane). The previous behaviour of the system may be used to determine the optimum recovery ratio and input flow required to achieve the required decrease in fouling (e.g. for a given raw water salinity). For example, the system may be configured to calculate, based on previous behaviour, that for a given raw water salinity, running a particular assembly with a particular input flow and particular recovery ratio for a particular time period will result in the fouling parameter changing by a particular amount.

Mitigating fouling can be achieved reducing the recovery ratio, for example, by maintaining the same feed flow but adjusting the system such that more of that flow is directed to the concentrate stream and less to the permeate stream. Increasing the crossflow velocity creates a "relaxation effect" and has been shown to lower the fouling state of a train over time. In order to maintain the overall production of the system, the assemblies in the system with a higher A-value will be adjusted to produce more clean water to compensate for the reduced production of the fouled assembly. In this way, the system may continually be adjusting the recovery ratio of the various trains and/or assemblies to produce the required water and to minimize energy and cleaning.

FIG. 2 is a flow diagram showing control of the reverse osmosis system.

As shown in FIG. 2, the controller is configured to receive 281 sensed parameters from sensor array. The received sensed parameters may include: a feed pressure; a feed flow; a feed salinity; a feed temperature; at least two of: feed flow, permeate flow, and concentrate flow; a permeate salinity; a differential pressure between the feed pressure and the concentrate pressure; and a permeate pressure.

From these received sensed parameters, the controller is configured to determine 282 A- and B-values for each reverse osmosis assembly, and an associated fouling parameter.

The controller is configured to determine 283, based on fouling parameter, the response of each reverse osmosis assembly to changes in input flow rate and recovery ratio. In this case, the stored behavior is derived from operational data determined during operation of the system (e.g. via steps 281 and 282) and/or from learning data received 287 by the controller as training data.

Based on the stored system behavior, received 284 total target permeate flow, the controller is configured to determine 285 the recovery ratio and input flow for each reverse osmosis assembly to meet received target permeate flow (and possibly permeate salinity/conductivity).

Then the controller is configured to enable 286 control of system based on determined recovery ratio and input flow for each reverse osmosis assembly. This will change the configuration of the system and so will change the sensed parameters. In addition, the sensed parameters may change as a result of the feed changing (e.g. the temperature or salinity of the feed changing). Therefore, the system is configured to continuously or periodically monitor the sensed parameters and make adjustments accordingly.

Multi-Train Algorithm

Figure 3:
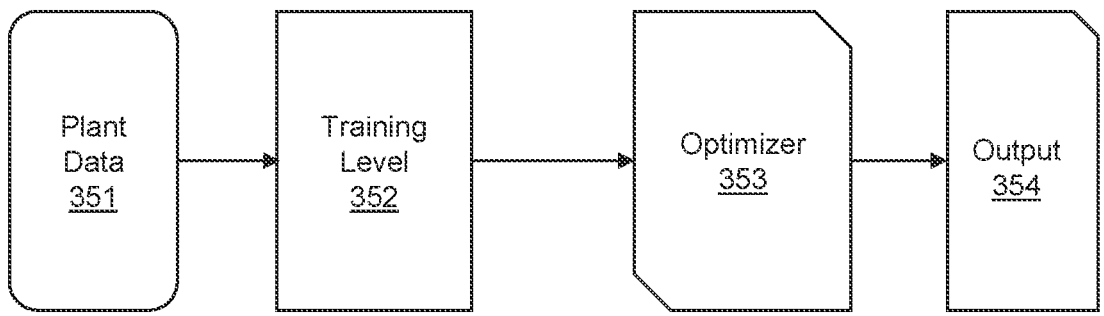
FIG. 3-5 are schematic diagrams of how the reverse-osmosis system data is used to control the reverse-osmosis system.
Figure 4:
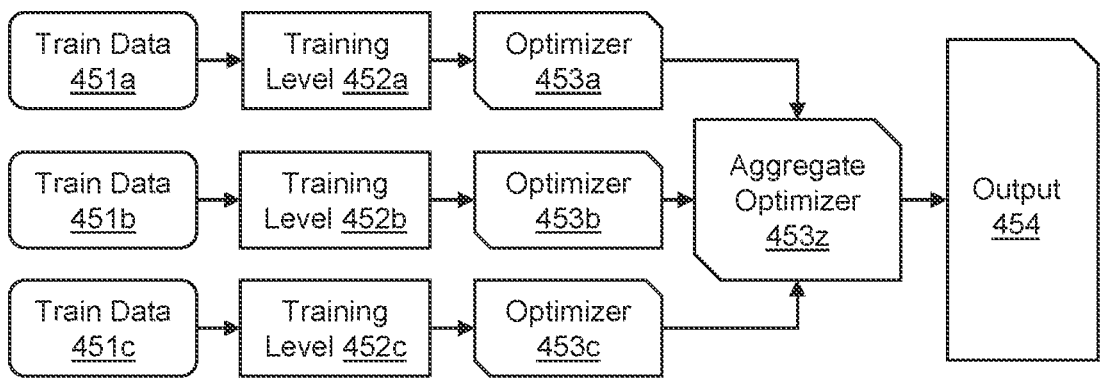
Figure 5:
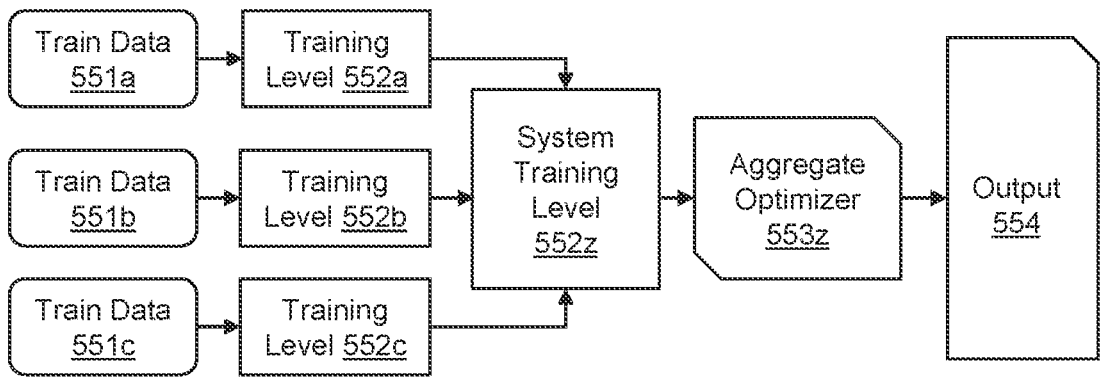

The multi-train algorithm is deployed in one of three ways, shown in FIGS. 3-5. The system may comprise a communication hub for communicating between the algorithms and humans.

In all three configurations, there are four stages:
Plant data: this includes information obtained by the sensors.
A training level: this includes how the system is configured to recognise trends in the plant data and predict a response.
An optimizer. this is how the system responds to the identified trends in order to identify adjustments that can be made to the system in order to achieve a particular goal (e.g. reducing cleaning, minimizing energy consumption).
An output stage. This relates to communicating the identified adjustments to either the system itself or a user.

In the system of FIG. 3, all plant data 351 are considered by the machine learning training level 352 together. Then these all go to an optimizer 353 together to calculate set points for each train which are communicated to the communication hub output 354.

In the system of FIG. 4, each single train (e.g. each reverse osmosis assembly of FIG. 1b) provides separate data 451a-b, which is then considered by an individual machine learning training level 452a-b specific to each train. Set points are produced by an independent optimizer 453a-c for each train. Then a second optimizer 453z (or meta optimizer) adjusts the flows between the trains to balance flows. Then communicated to the communication hub output 454.

In the system of FIG. 5, (e.g. each reverse osmosis assembly of FIG. 1b) provides separate data 551a-b, which is then considered by an individual machine learning training level 552a-b specific to each train. A meta plant level machine learning training level 552z is then used to model the plant. Then a plant level set point optimizer 553z is used. Set points are then communicated to the communication hub output 554.

Case Study

Figure 6:
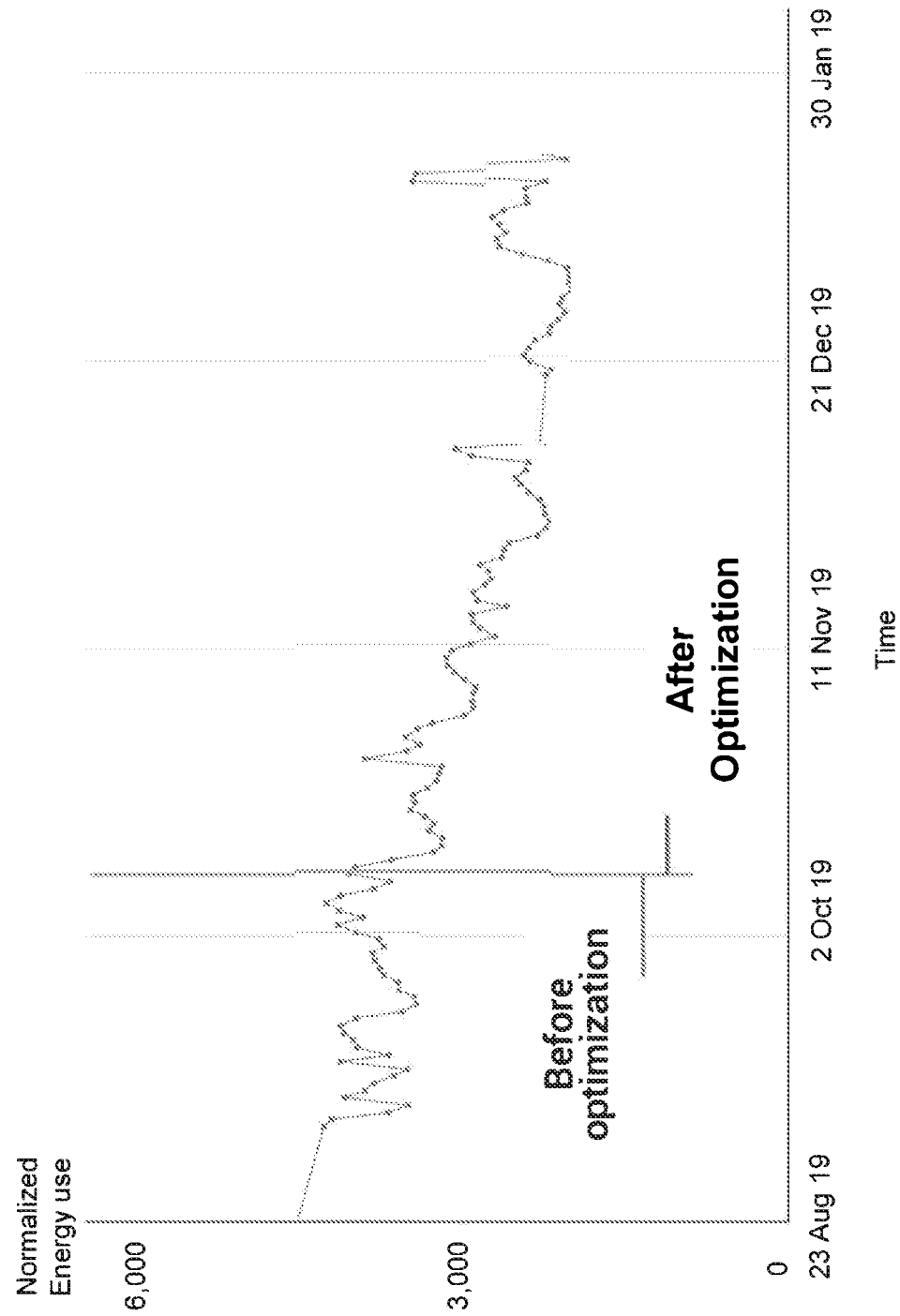
FIG. 6 is a graph of energy use over a year.

A case study in Western Australia demonstrated the concept of reducing the fouling state of a plant, which was very unexpected. In FIG. 6, data shows that over time the fouling state of the plant has improved. The measure below shows "normalized energy use", which is calculated by the energy use (kWh/m3) divided by A-value. The system A-Value is an averaged value of the A-values of the component RO trains, calculated according to the Dow Filmtec™ Reverse Osmosis Manual (Form No. 609-00071-1009).

This removes the effect of temperature and salinity fluctuations and thus indicates the fouling state at the plant. At the Western Australian plant, since 11 Oct. 2019, the plant was optimized according to the present method and the fouling state has dramatically improved.

This process minimizes the need to clean the plant, extending the time between cleaning periods. Less cleans per year thus reduces the annual spend on chemicals. To decrease the fouling state of any one train, the machine learning will increase the feed water flow but decrease the permeate flow. This increases the crossflow velocity on the membrane and may have the effect of washing off the fouling material. By optimizing the flows between multiple trains, the system controls when each particular train should be cleaned, allowing early warning to the operator on when a clean should be scheduled. During operation, the flows from one train will be diminished over time and eventually the train with the lowest A-value will be cleaned. The cleaning aspect to the algorithms will be used across the multiple trains to continually predict time to cleaning and work in unison with the multi-train flow selection.

Some plants will have "N+1" trains onsite. This means their flow can be made with N trains and they have one spare train, allowing them to clean and still produce the same amount of water. The ML will be able to operate all trains simultaneously if needed (e.g. if 25+1 trains, then the algorithm can operate 26 trains rather than 25 online and one in standby). At times this could lead to greater efficiency and further reduce cleaning frequency, while still allowing the shutdown of one train to for cleaning and making the minimum water production specification.

Additionally, by collecting the SDI metric, the ML will trigger to reduce flows (via a recovery change) when the feed water decreases in quality, thus evenly alleviating the fouling risk to the entire plant across all trains, during periods of high fouling risk.

Cleaning Prediction

A prototype approach was prepared for optimizing the point at which to perform chemical cleaning on RO membranes as the membranes foul, by balancing the cost of cleaning against the increased energy cost of producing permeate through fouled membranes. Observed in many RO operations, an inflection point in membrane fouling occurs where performance degradation drastically accelerates after some tipping point compared to the operation before this point. Inspired by this observation, the proposed approach utilizes a piecewise linear model capable of predicting the point at which this inflection occurs and the slope of the degradation after the inflection point. Using this predictive model, the optimal point at which to clean can be selected by simulating the expected energy costs of operation under cleaned conditions vs non-cleaned conditions at every point in the future up to some permeate production limit. The point which yields the lowest expected cost of operation (energy+ cleaning costs) through the period of simulation is selected as the optimal point to perform chemical cleaning.

In order to build a model of how membrane performance degrades between chemical cleans, the period of operation between cleanings needs to be captured. The sequence mode data is utilized to define these periods. That is normal operation is identified as being a normal mode, and cleaning data is associated with a particular type of cleaning (e.g. a chemical cleaning mode, and a flow cleaning mode). When one of the cleaning modes is triggered, the normal mode data collected up to that point is frozen and a new collection period is triggered.

Figure 7:
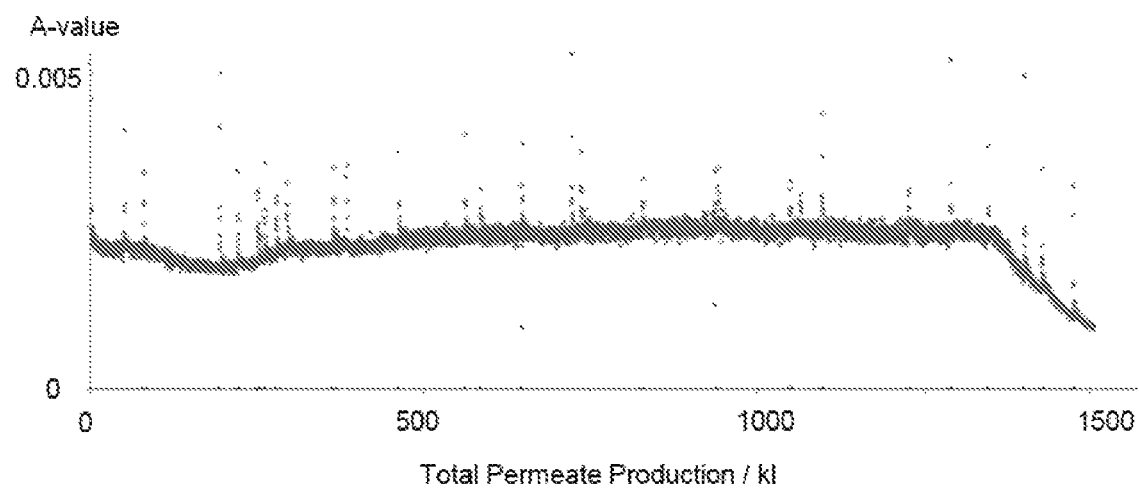
FIG. 7 is a graph of how the A-value of a reverse osmosis system changes with permeate volume produced.

FIG. 7 depicts the A-value performance versus cumulative permeate production for each collected operating period. In general, a trend of eventual A-value degradation can be observed as more permeate is produced, indicating increasing levels of fouling. The following figure depicts a subset of these operating periods. At the end (around 1300-1400 kl), there is a more severe drop-off in performance which is indicated by an inflection point in the graph.

Based on observations from the period of operation graphs (i.e. when the system is in a normal mode of operation, rather than in a cleaning mode), a subset of operating periods is selected to train a piecewise linear model on. The model performs a piecewise linear fit by minimizing the mean squared error in predicting A-values using 2 linear models and a break point to transition from the first linear model to the second.

Using the trained models, the models are applied to make predictions by looking up the closest model to our current subject operating period. A seed amount of data from the current operation is used to calculate the current slope of one or more of: A-value, normalized differential pressure and B-Value. This slope is used to look up the most similar slope in a previous operating period. The inflection point and secondary slope after the inflection point from this most similar operating period is then utilized to predict the performance (one or more of A-value, Normalized Differential Pressure and B-Value) of the current operating period.

Using the predictive modeling approach described above, an optimization can be performed by using the predictive model to forecast future energy costs of operation given the decision to perform a chemical cleaning. Given a seed amount of current operating data, the predicted A-values and subsequent cost of operating under the predicted A-value performance can be calculated.

Figure 8:
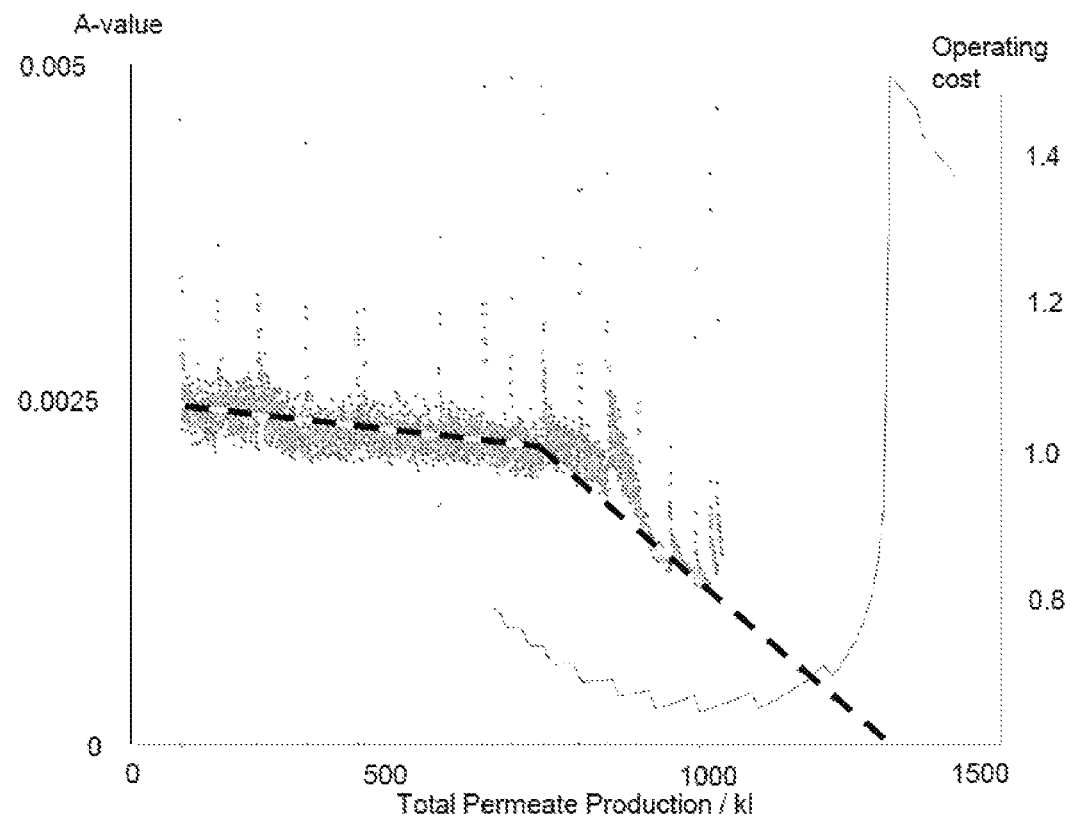
FIG. 8 is a graph of how the A-value can be predicted.

This is shown in FIG. 8 which depicts the measured A-value as a function of total permeate production. It then predicts how the A-value will behave as more permeate is produced by the plant. The predicted trend in A-values is shown as a dotted line. Based on the energy consumption of pumping water through the membranes of a particular A-value, an overall operating cost can be calculated (e.g. in terms of energy consumption cost or an actual dollar amount). This is shown as a solid grey line. Based on this, the optimum time for cleaning may be calculated.

Figure 9:
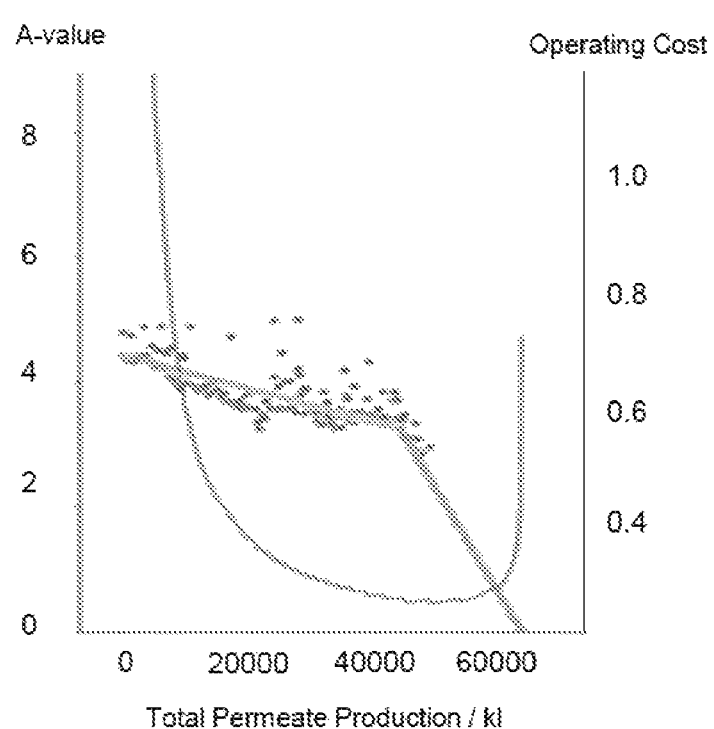
FIG. 9 is another graph of how the A-value can be predicted.

FIG. 9 shows a further graph which depicts the measured A-value as a function of total permeate production. FIG. 9 shows real world data from a plant in Europe treating brackish groundwater. It shows the A-Value trend of a single time period between two cleaning events. The dots show the actual A-Value (y-axis) for each permeate production value (x-axis) from the plant's operating data. The inflection line on top of this shows what the algorithm would have predicted for the same time period (noting that the algorithm was trained on historic data from the plant, but blind to the conditions of this particular clean). This shows the effectiveness of the algorithm for predicting the inflection point. The curve shows the operating costs at any particular permeate production value and therefore the lowest point in the curve predicts the best time to clean the RO, in this case after about 52,000 kL of permeate produced. This algorithm has been used to predict the best time to clean several weeks in advance of the cleaning date (e.g. two or more week in advance).

The measured A-values are shown in dark dots which vary considerably. It then predicts how the A-value will behave as more permeate is produced by the plant. The predicted trend in A-values is shown as grey dots line. The predicted trend forms two straight lines of grey dots intersecting at an angle. Based on the energy consumption of pumping water through the membranes of a particular A-value, an overall operating cost can be calculated (e.g. in terms of energy consumption cost or an actual dollar amount). This is shown as a solid grey line. Based on this, the optimum time for cleaning may be calculated.

At every future timestep, the decision to perform a chemical cleaning can be simulated and the cost of operation up to this point (cost of energy+cleaning) is totaled. Under the assumption that the next operating periods will mimic the current one post chemical cleaning, the total cost of operating under a policy of cleaning at the currently simulated point can be computed up to a specified total permeate production. The point of cleaning that results in the minimal total operating cost is selected at the optimal point to perform cleaning during the current operating period. This approach can be back-tested on historical operating periods and the actual cost of cleaning at the optimized point versus the historical point can be compared to calculate potential savings for each period.

Figure 10:
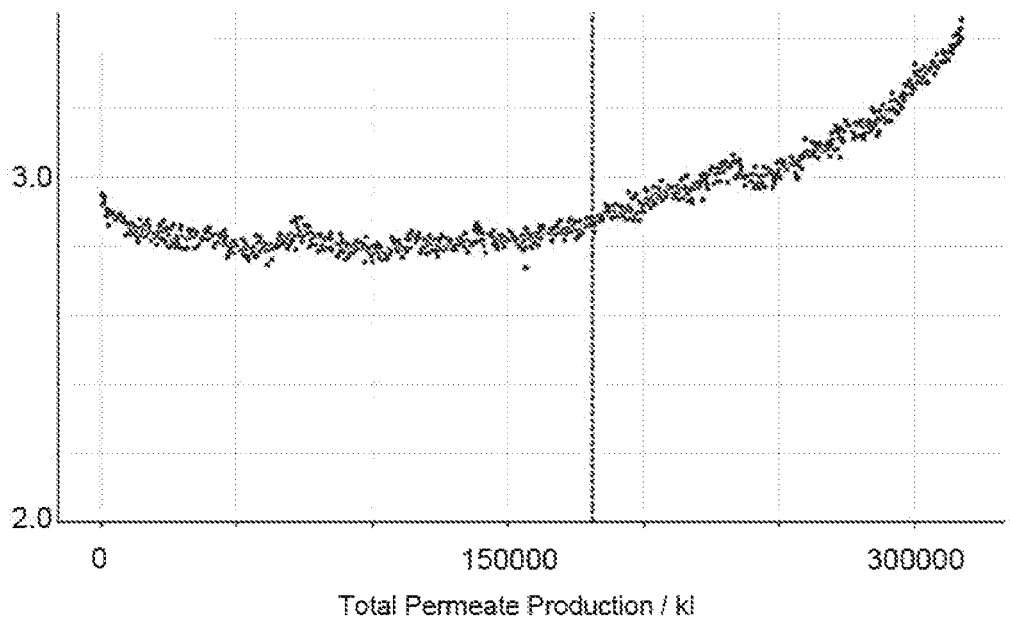
FIG. 10 is a graph of how the differential pressure can be predicted.

FIG. 10 shows real world data from a plant in Asia treating reuse water. It shows the Normalized Differential Pressure trend of a single time period between two cleaning events. The dots show the actual Normalized Differential Pressure (y-axis) for each permeate production value (x-axis) from the plant's operating data. In this case the real-world data was used to train the algorithm, then applied to test data to prove its effectiveness. The vertical line shows the best time to clean the RO as predicted by the algorithm, in this case after about 180,000 kL of permeate produced. While the inflection point is more subtle here, the algorithm was able to predict this timing. Due to this more challenging inflection prediction for this plant, the prediction could be made 3-5 days ahead of the occurrence. In this case the plant is most interested in cleaning at a lower pressure, rather than overall operating expense (OPEX) savings and so the savings are expressed the Normalized Differential Pressure difference between predicted time to clean and the actual time the plant cleaned historically (i.e. cleaning at 180,000 kL and 2.8 bar vs cleaning at 320,000 kL and 3.41 bar produced a savings of 0.61 bar).

Other Options

The controller may be configured to calculate the energy consumption based on the data received from the sensor array. In other embodiments, the sensor array may comprise an energy or power sensor configured to measure the energy/power consumption of the system.

The controller may be configured to calculate one or more of: normalized differential pressure (or feed channel pressure drop), normalized salt passage, normalized flux, A-value, B-value.

The controller may be configured for the optimization of energy recovery devices. Feed flow to the energy recovery device determines its best efficiency point. Additionally, minimizing over flush will reduce wasted pumping energy. Zero over flush corresponds to "balanced flow" when the feedwater inlet flow rate equals the feedwater outlet flow rate.

The system may be configured to take pump set point efficiency into account. Each pump has its best efficiency point and often plants will not run at this precise condition.

The above system is configured to create energy savings. On a 300,000 m$^3$/day plant, if 0.2 kWhr/m$^3$ is saved, $1.5M in energy alone can be saved at 15c/kWh.

The system could monitor the weather and thus predict seawater (or feed water) temperature and furthermore make the system produce more water on warmer days and less water on cooler days (thus reducing energy), but result in the same amount of water produced over a longer time period, such as one week. The controller may be configured to set up the system based on predicted water temperature (e.g. by receiving ambient temperature data, comparing with measured feed water temperatures as well as comparing with a government (or private) agency's predicted ambient temperature values and predicting the feed water temperature for an upcoming point in time). Such a system would use machine learning to produce the predicted feed water temperature.

The system may comprise a holding tank for permeate water. The system may be configured to use predictive temp and/or salinity Machine Learning to generate a reservoir of clean water when conditions are optimal. For example, in a seawater system, the controller may use plant data and publicly available weather data to aid planning for the following day/week (e.g. make more water when temp is highest to save max energy).

This technology may be particularly useful in areas where feedwater quality to a reverse osmosis system changes substantially (e.g. in breweries, dairy and oil and gas). Of particular interest are river water plants that are tidally affected (for example in the Thames River, UK). Additionally, brackish groundwater plants that are affected by saltwater intrusion dynamics in the aquifer, meaning salinity changes with time.

The apparatus may be configured to schedule cleaning across multiple trains. This could link with our multi-train optimization for energy optimization, using cleaner trains to produce more water and accounting for cleaning time on various other trains (i.e. an algorithm without this may predict a cleaning for multiple trains on the same day, which is not possible). A train is a bank of RO membranes and most plants will have multiple trains. This makes a plant modular and adds flexibility in operations. Sometimes a train is referred to as a rack.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A reverse-osmosis system comprising:
   multiple reverse-osmosis assemblies, each reverse-osmosis assembly comprising:
   a reverse-osmosis stage having a semi-permeable membrane, a feed inlet, a permeate outlet and a concentrate outlet, wherein the feed inlet is configured to receive feed water having a feed-water flow rate;
   a concentrate valve configured to control the pressure of the concentrate outlet;
   a liquid-monitoring sensor array having:
   a feed pressure sensor;
   at least one of: a feed salinity and a conductivity sensor;
   a feed temperature sensor;

at least two flow sensors configured to measure at least two of: feed flow, permeate flow, and concentrate flow;

at least one of: a permeate salinity and a conductivity sensor;

a differential pressure sensor configured to measure the difference between the feed pressure and the concentrate pressure; and a permeate presure sensor; and a controller configured:

to receive information from the liquid monitoring sensor array;

to calculate, from the received information, one or more of: an A-Value, a B-value and a normalized differential pressure value, for each reverse-osmosis stage, wherein the A-Value is a measure of a water permeability of the semi-permeable membrane, and the B-Value is a measure of a salt diffusion rate through the semi-permeable membrane;

to determine a fouling parameter for each reverse-osmosis stage based on one or more of: the A-Value, the B-Value, and the normalized differential pressure value; and to individually control flow through each of the reverse-osmosis assemblies to meet a predetermined criterion for total permeate production for the reverse-osmosis system, wherein the control comprises alternating each of the reverse-osmosis stages between a production mode and an anti-fouling mode based on the determined fouling parameter, wherein the production mode has increased permeate flow through the semi-permeable membrane and decreased concentrate flow as compared to that of the anti-fouling mode and is configured to permit fouling of the semi-permeable membrane, and the anti-fouling mode has decreased flow through the semi-permeable membrane and increased concentrate flow as compared to that of the production mode and is configured to at least partially remove fouling of the semi-permeable membrane, and wherein, in both the production and anti-fouling modes, each stage continues to produce cleaned permeate water at the respective permeate outlet.

2. The system of claim 1, wherein the controller is configured to control the flow through each of the reverse-osmosis assemblies comprises by individually adjusting a recovery ratio of each of the reverse-osmosis assemblies.

3. The system according to claim 1, wherein the controller is configured to control the flow through each of the reverse-osmosis assemblies comprises by adjusting feed flow provided to each of the reverse-osmosis assemblies.

4. The system according to claim 1, wherein the controller is configured to use machine learning to predict the response of controlling the flow through each of the reverse-osmosis assemblies.

5. The system according to claim 1, wherein the controller is configured to enable control of flow through each of the reverse-osmosis assemblies based on the received information and on previous behaviour of the system to meet predetermined permeate flow and permeate salinity criteria and to reduce energy consumption.

6. The system according to claim 1, wherein the controller is configured to increase permeate production of the reverse-osmosis assemblies which have a fouling parameter indicative of less fouling and increase concentrate production of the reverse-osmosis assemblies which have a fouling parameter indicative of more fouling.

7. The system according to claim 1, wherein the controller is configured to decrease flow through the feed inlets of the reverse-osmosis assemblies which have a fouling parameter indicative of less fouling and increase flow through the feed inlets of the reverse-osmosis assemblies which have a fouling parameter indicative of more fouling.

8. The system according to claim 1, wherein the controller is configured to control the flows through the reverse osmosis assemblies in real time to meet predetermined total permeate flow and total permeate salinity criteria and to reduce cleaning.

9. The system according to claim 1, wherein the reverse-osmosis system comprises an energy sensor configured to measure the energy consumption of the system.

10. The system according to claim 1, wherein the concentrate flow comprises a cross flow that passes along an inlet side of the semi-permeable membrane.

11. The system according to claim 10, wherein, in the anti-fouling mode, the cross flow flushes away concentrated fouling material from the inlet side of the semi-permeable membrane to the concentrate outlet to at least partially remove the fouling from the semi-permeable membrane.

12. A method of controlling a reverse-osmosis system comprising multiple reverse-osmosis assemblies, each reverse-osmosis assembly comprising:

a reverse-osmosis stage comprising a semi-permeable membrane, a feed inlet, a permeate outlet and a concentrate outlet, wherein the feed inlet is configured to receive feed water powered by a feed pump; and a concentrate valve configured to control the pressure of the concentrate outlet flow;

the method comprising:

measuring a feed pressure;

measuring a feed salinity and/or conductivity;

measuring a feed temperature;

measuring at least two of: feed flow, permeate flow, and concentrate flow;

measuring a permeate salinity and/or conductivity;

measuring a differential pressure configured to measure the difference between the feed pressure and the concentrate pressure;

measuring a permeate pressure; and determining a fouling parameter for each reverse-osmosis stage based on one or more of: an A-Value, a B-value and a normalized differential pressure value; wherein the A-Value is a measure of a water permeability of the semi-permeable membrane; and the B-Value is a measure of a salt diffusion rate through the semi-permeable membrane; and individually controlling the flow through each of the reverse-osmosis assemblies to meet a predetermined criterion for total permeate production for the reverse-osmosis system, wherein the controlling the flow through each of the reverse-osmosis assemblies comprises alternating each of the reverse-osmosis stages between a production mode and an anti-fouling mode based on the determined fouling parameter, wherein the production mode has increased permeate flow through the semi-permeable membrane and decreased concentrate flow as compared to that of the anti-fouling mode and is configured to permit fouling of the semi-permeable membrane, and the anti-fouling mode has decreased flow through the semi-permeable membrane and increased concentrate flow as compared to that of the production mode and is configured to at least partially remove fouling of the semi-permeable membrane, and wherein, in both the production and anti-fouling modes, each stage continues to produce cleaned permeate water at the respective permeate outlet.

13. A non-transitory medium comprising a computer program, the computer program comprising computer program code configured to run on a computer in conjunction with a reverse-osmosis system comprising multiple reverse-osmosis assemblies, each reverse-osmosis assembly comprising:
   a reverse-osmosis stage comprising a semi-permeable membrane, a feed inlet, a permeate outlet and a concentrate outlet, wherein the feed inlet is configured to receive feed water powered a feed pump;
   a concentrate valve configured to control the pressure of the concentrate outlet flow;
   a liquid-monitoring sensor array having:
      a feed pressure sensor;
      a feed salinity and/or conductivity sensor;
      a feed temperature sensor;
      at least two flow sensors configured to measure at least two of: feed flow, permeate flow, and concentrate flow;
      a permeate salinity and/or conductivity sensor;
      a differential pressure sensor configured to measure the difference between the feed pressure and the concentrate pressure;
      a permeate pressure sensor;
   wherein the computer program code is configured to control the computer to enable:
      receiving information from the liquid-monitoring sensor array;
      determining a fouling parameter for each reverse-osmosis stage based on one or more of: an A-Value, a B-value and a normalized differential pressure, wherein the A-Value is a measure of a water permeability of the semi-permeable membrane; and
      individually controlling flow through each of the reverse-osmosis assemblies to meet a predetermined criterion for total permeate production for the reverse-osmosis system,
      wherein the controlling comprises alternating each of the reverse-osmosis stages between a production mode and an anti-fouling mode based on the determined fouling parameter, wherein the production mode has increased permeate flow through the semi-permeable membrane and decreased concentrate flow as compared to that of the anti-fouling mode and is configured to permit fouling of the semi-permeable membrane, and the anti-fouling mode has decreased concentrate flow through the semi-permeable membrane and increased concentrate flow as compared to that of the production mode and is configured to at least partially remove fouling of the semi-permeable membrane, and
      wherein, in both the production and anti-fouling modes, each stage continues to produce cleaned permeate water at the respective permeate outlet.

14. A reverse-osmosis system comprising:
   a reverse-osmosis stage having a semi-permeable membrane, a feed inlet, a permeate outlet and a concentrate outlet, wherein the feed inlet is configured to receive feed water having a feed-water flow rate;
   a concentrate valve configured to control the pressure of the concentrate outlet;
   a liquid-monitoring sensor array configured to monitor parameters of the liquid flowing through each stage, the liquid-monitoring sensor array having:
      a feed pressure sensor;
      at least one of: a feed salinity and a conductivity sensor;
      a feed temperature sensor;
      at least two flow sensors configured to measure at least two of: feed flow, permeate flow, and concentrate flow;
      at least one of: a permeate salinity and a conductivity sensor;
      a differential pressure sensor configured to measure the difference between the feed pressure and the concentrate pressure; and
      a permeate pressure sensor; and
   a controller configured:
      to receive liquid-monitoring information from the liquid-monitoring sensor array on the monitored parameters of the liquid flowing through each stage;
      to calculate, from the received liquid-monitoring information, one or more of: an A-Value, a B-value and a normalized differential pressure value, for each reverse-osmosis stage, wherein the A-Value is a measure of a water permeability of the semi-permeable membrane, and the B-Value is a measure of a salt diffusion rate through the semi-permeable membrane;
      to determine a fouling parameter based on one or more of: the A-Value, the B-value and the normalized differential pressure; and
      to calculate how the fouling parameter would change as a function of permeate production for various flow rates through the feed inlet and recovery ratios, based on previous parameters monitored by the liquid-monitoring sensor array, wherein calculating how the fouling parameter would change comprises calculating an estimate of when an inflection point will occur in the fouling parameter as a function of cumulative permeate flow due to membrane fouling based on previous behaviour of the system.

15. The system according to claim 14, wherein calculating how the fouling parameter would change comprises calculating an estimate of when an inflection point will occur in the fouling parameter as a function of cumulative permeate flow due to membrane fouling based on previous parameters of the liquid flowing through the reverse-osmosis stage monitored by the liquid-monitoring sensor array.

16. The reverse-osmosis system of claim 14, wherein the system is configured to calculate the future energy consumption of the reverse-osmosis system based on the estimated inflection point; and to determine the optimum time to clean the reverse-osmosis stage, based on the calculated future energy consumption.

17. The reverse-osmosis system according to claim 14, wherein the system is configured to calculate an estimate of when a change will occur in the rate of change of fouling parameter as a function of cumulative permeate flow due to membrane fouling based on previous behaviour of the system.

18. The reverse-osmosis system according to claim 14, wherein the calculation of how the fouling parameter would change as a function of permeate production is based on one or more of: the feed salinity and the feed conductivity.

19. The reverse-osmosis system according to claim 14, wherein the calculation of how the fouling parameter would change as a function of permeate production is based on the feed temperature.

20. A method of controlling a reverse-osmosis system, the reverse-osmosis system comprising:

a reverse-osmosis stage having a semi-permeable membrane, a feed inlet, a permeate outlet and a concentrate outlet, wherein the feed inlet is configured to receive feed water having a feed-water flow rate; and a concentrate value configured to control the pressure of the concentrate outlet;

the method comprising:
measuring a feed pressure;
measuring a feed salinity and/or conductivity;
measuring a feed temperature;
measuring at least two of: feed flow, permeate flow, and concentrate flow;
measuring a permeate salinity and/or conductivity;
measuring a differential pressure configured to measure the difference between the feed pressure and the concentrate pressure;
measuring a permeate pressure;
calculating, from the measured information, one or more of: an A-Value, a B-value and a normalized differential pressure value, for the reverse-osmosis stage, wherein the A-Value is a measure of a water permeability of the semi-permeable membrane, and the B-Value is a measure of a salt diffusion rate through the semi-permeable membrane;
determining a fouling parameter based on one or more of: the A-Value, the B-value and the normalized differential pressure; and
calculating how the fouling parameter would change as a function of permeate production for various flow rates through the feed inlet and recovery ratios, based on previous parameters monitored by a liquid-monitoring sensor array of the reverse-osmosis stage configured to monitor parameters of liquid flowing through the reverse-osmosis stage, wherein calculating how the fouling parameter would change comprises calculating an estimate of when an inflection point will occur in the fouling parameter as a function of cumulative permeate flow due to membrane fouling based on previous behaviour of the system.

21. A non-transitory medium comprising a computer program, the computer program comprising computer program code configured to run on a computer in conjunction with a reverse-osmosis system, the reverse-osmosis system comprising:

a reverse-osmosis stage having a semi-permeable membrane, a feed inlet, a permeate outlet and a concentrate outlet, wherein the feed inlet is configured to receive feed water having a feed-water flow rate;

a concentrate value configured to control the pressure of the concentrate outlet;

a liquid-monitoring sensor array configured to monitor parameters of the liquid flowing through each stage, the liquid-monitoring sensor array having:

a feed pressure sensor;
at least one of: a feed salinity and a conductivity sensor;
a feed temperature sensor;
at least two flow sensors configured to measure at least two of: feed flow, permeate flow, and concentrate flow;
at least one of: a permeate saliity and a conductivity sensor;
a differential pressure sensor configured to measure the difference between the feed pressure and the concentrate pressure; and
a permeate pressure sensor, and wherein the computer program code is configured to control the computer to enable:

receiving liquid-monitoring information from the liquid-monitoring sensor array on the monitored parameters of the liquid flowing through each stage; and calculating, from the received liquid-monitoring information, one or more of: an A-Value, a B-value and a normalized differential pressure value, for each reverse-osmosis stage, wherein the A-Value is a measure of a water permeability of the semi-permeable membrane, and the B-Value is a measure of a salt diffusion rate through the semi-permeable membrane;

determining a fouling parameter based on one or more of: the A-Value, the B-value and the normalized differential pressure; and calculating how the fouling parameter would change as a function of permeate production for various flow rates through the feed inlet and recovery ratios, based on previous parameters monitored by the liquid-monitoring sensor array, wherein calculating how the fouling parameter would change comprises calculating an estimate of when an inflection point will occur in the fouling parameter as a function of cumulative permeate flow due to membrane fouling based on previous behaviour of the system.

* * * * *